(12) United States Patent
Restuccia et al.

(10) Patent No.: US 11,575,987 B2
(45) Date of Patent: Feb. 7, 2023

(54) UNDERWATER ULTRASONIC COMMUNICATION SYSTEM AND METHOD

(71) Applicant: Northeastern University, Boston, MA (US)

(72) Inventors: Francesco Restuccia, Boston, MA (US); Emrecan Demirors, Boston, MA (US); Tommaso Melodia, Newton, MA (US)

(73) Assignee: Northeastern University, Boston, MA (US)

( * ) Notice: Subject to any disclaimer, the term of this patent is extended or adjusted under 35 U.S.C. 154(b) by 237 days.

(21) Appl. No.: 15/992,304

(22) Filed: May 30, 2018

(65) Prior Publication Data
US 2018/0352326 A1 Dec. 6, 2018

Related U.S. Application Data

(60) Provisional application No. 62/512,451, filed on May 30, 2017.

(51) Int. Cl.
| | | |
|---|---|---|
| *G10K 11/00* | (2006.01) | |
| *H04R 1/44* | (2006.01) | |
| *H04R 1/22* | (2006.01) | |
| *H04R 3/00* | (2006.01) | |

(Continued)

(52) U.S. Cl.
CPC .......... *H04R 1/44* (2013.01); *G06F 3/162* (2013.01); *H04B 11/00* (2013.01); *H04R 1/222* (2013.01); *H04R 3/00* (2013.01); *H04R 2499/11* (2013.01); *H04R 2499/15* (2013.01)

(58) Field of Classification Search
None
See application file for complete search history.

(56) References Cited

U.S. PATENT DOCUMENTS

| | | | | |
|---|---|---|---|---|
| 3,114,884 A | * | 12/1963 | Jakowatz | G06G 7/1928 |
| | | | | 327/552 |
| 3,764,964 A | * | 10/1973 | Seeley, Jr. | G01S 3/808 |
| | | | | 367/117 |

(Continued)

FOREIGN PATENT DOCUMENTS

| | | |
|---|---|---|
| GB | 2477034 A | 7/2011 |
| WO | WO-2015048820 A1 * | 4/2015 ........... A61B 5/0028 |

OTHER PUBLICATIONS

Demirors, E. et al., "Software-defined underwater acoustic networks: toward a high-rate real-time reconfigurable modem", IEEE Communications Magazine, Nov. 2015 vol. 53, Issue 11, pp. 64-71.

(Continued)

*Primary Examiner* — Isam A Alsomiri
*Assistant Examiner* — Jonathan D Armstrong
(74) *Attorney, Agent, or Firm* — Verrill Dana, LLP

(57) ABSTRACT

An underwater acoustic communication system for a mobile electronic device, such as a smartphone, has a communication unit with one or more ultrasonic transducers to transmit and receive underwater ultrasonic signals. The communication unit is connected to an audio auxiliary interface of the mobile electronic device. A processing unit in communication with the auxiliary interface receives RF signals from and transmits RF signals to the communication unit via the audio auxiliary interface.

20 Claims, 11 Drawing Sheets

(51) Int. Cl.
*G06F 3/16* (2006.01)
*H04B 11/00* (2006.01)

(56) References Cited

U.S. PATENT DOCUMENTS

| | | | | |
|---|---|---|---|---|
| 3,903,470 | A * | 9/1975 | Mirabile | G01R 23/02 |
| | | | | 324/76.16 |
| 3,928,777 | A * | 12/1975 | Massa | B06B 1/0681 |
| | | | | 310/326 |
| 4,103,309 | A * | 7/1978 | Massa | G02B 7/40 |
| | | | | 352/140 |
| 5,630,012 | A * | 5/1997 | Nishiguchi | G10L 25/93 |
| | | | | 704/201 |
| 5,910,948 | A * | 6/1999 | Shou | H04W 48/18 |
| | | | | 370/335 |
| 6,392,959 | B1 * | 5/2002 | Jackson | G01S 3/807 |
| | | | | 367/100 |
| 8,358,644 | B2 * | 1/2013 | Baxley | H04L 27/262 |
| | | | | 370/350 |
| 8,804,691 | B1 * | 8/2014 | Zhao | H04L 27/2659 |
| | | | | 370/350 |
| 10,396,948 | B2 * | 8/2019 | Melodia | H04L 5/0012 |
| 2005/0102419 | A1 * | 5/2005 | Popescu | H04L 43/0811 |
| | | | | 709/238 |
| 2008/0279047 | A1 * | 11/2008 | An | H04B 11/00 |
| | | | | 367/134 |
| 2009/0037503 | A1 * | 2/2009 | Peng | H04L 27/0014 |
| | | | | 708/207 |
| 2009/0119111 | A1 * | 5/2009 | Goto | G10L 19/008 |
| | | | | 704/500 |
| 2009/0257532 | A1 * | 10/2009 | Skiscim | H04L 7/042 |
| | | | | 375/343 |
| 2010/0091742 | A1 * | 4/2010 | Lee | H04L 7/042 |
| | | | | 370/336 |
| 2011/0167391 | A1 * | 7/2011 | Momeyer | G06F 3/038 |
| | | | | 715/863 |
| 2011/0313763 | A1 * | 12/2011 | Amada | H04R 3/005 |
| | | | | 704/233 |
| 2012/0250830 | A1 * | 10/2012 | Lam | H04M 3/56 |
| | | | | 379/32.01 |
| 2014/0006457 | A1 * | 1/2014 | Ninomiya | G06F 16/211 |
| | | | | 707/797 |
| 2014/0051352 | A1 | 2/2014 | Wolfe et al. | |
| 2015/0146874 | A1 * | 5/2015 | Ojanpera | H04R 29/00 |
| | | | | 381/56 |
| 2015/0180695 | A1 * | 6/2015 | Hashizume | H04W 72/0413 |
| | | | | 370/329 |
| 2015/0227197 | A1 * | 8/2015 | Nomura | G06F 3/04842 |
| | | | | 345/156 |
| 2015/0261322 | A1 * | 9/2015 | Lye | G06F 3/0383 |
| | | | | 345/162 |
| 2016/0154131 | A1 * | 6/2016 | Guillouet | G01V 1/375 |
| | | | | 367/41 |
| 2017/0048093 | A1 * | 2/2017 | Huang | H04L 27/26 |
| 2017/0257245 | A1 * | 9/2017 | Shinagawa | H04L 27/2656 |
| 2019/0059055 | A1 * | 2/2019 | Murali | H04W 52/0216 |
| 2019/0189134 | A1 * | 6/2019 | Li | H04S 3/00 |
| 2019/0339386 | A1 * | 11/2019 | Ding | G01S 15/931 |
| 2020/0033462 | A1 * | 1/2020 | Ding | G01S 15/104 |

OTHER PUBLICATIONS

Demirors, E. et al., "Design of a Software-defined Underwater Acoustic Modem with Real-time Physical Layer Adaptation Capabilities", Proceedings of the International Conference on Underwater Networks & Systems, WUWNet '14 Jan. 1, 2014 (Jan. 1, 2014), pp. 1-8, doi: 10.1145/2671490.2674473.

Peng, Z. et al., "NAMS: A Networked Acoustic Modem System for Underwater Applications", OCEANS'11 MTS/IEEE Kona, Waikoloa, HI, Sep. 2011, pp. 1-5. doi: 10.23919/OCEANS.2011.6107196.

Torres, D. et al., "Software-defined underwater acoustic networking platform and its applications", Elsevier, Ad Hoc Networks Nov. 2015, vol. 34 pp. 252-264 doi.org/10.1016/j.adhoc.2015.01.010.

* cited by examiner

UNDERWATER ULTRASONIC COMMUNICATION SYSTEM AND METHOD

CROSS REFERENCE TO RELATED APPLICATIONS

This application claims priority under 35 U.S.C. § 119(e) of U.S. Provisional Application No. 62/512,451, filed on May 30, 2017, entitled "Hardware and Software for Underwater Networking with Amphibious Smartphones," the disclosure of which is hereby incorporated by reference.

STATEMENT REGARDING FEDERALLY SPONSORED RESEARCH OR DEVELOPMENT

The invention was developed with financial support from grant No. CNS-1503609 from the National Science Foundation. The U.S. Government has certain rights in the invention.

BACKGROUND

Smartphone distributors have released high-end smartphones that are also water-resistant, such as Apple's iPhone 7, Samsung's Galaxy S7 and Sony's Xperia phones. In particular, the iPhone 7 and Galaxy S7 have international protection (IP) ratings of 67 and 68, which means that they can be submerged without hardware damage for 30 minutes under 1 m and 1.5 m of water, respectively.

SUMMARY

An underwater acoustic communication system is provided for communication to and from underwater or amphibious electronic devices, such as smartphones. The underwater acoustic communication system can include a communication unit with one or more ultrasonic transducers to transmit and receive underwater ultrasonic signals. The communication unit can be connected to an audio interface of a mobile electronic device. The system can include a processing unit in communication with the audio interface to receive RF signals from and transmit RF signals to the communication unit via the audio interface.

In some embodiments, the communication system can implement end-to-end software-defined networking between amphibious mobile devices. In some embodiments, the system can transform a mobile device, including an off-the-shelf smartphone, into an ultrasonic software "radio." In some embodiments, the system can employ an auxiliary interface of a mobile device to send and receive information. In some embodiments, the system can implement an orthogonal frequency division multiplexing-based communication system to provide reliable transmission in a water communication channel. In some embodiments, the system can achieve a packet error rate (PER) on the order of $10^{-3}$, which is significant considering the low audio sampling rate and the strong multipath effect induced by the water tank environment.

In other aspects, a method of transmitting underwater acoustic signals to and from an underwater electronic device can be provided. A communication unit for an underwater acoustic communication system can be provided. A processing unit in communication with an audio interface on an underwater electronic device can be provided. The processing unit can be reconfigurable.

Other aspects of the system, method, and devices include the following:

1. An underwater acoustic communication system comprising:
a communication unit comprising one or more ultrasonic transducers to transmit and receive underwater ultrasonic acoustic signals through a water communication channel, the communication unit connected to an audio interface of an underwater electronic device to send and receive radio frequency (RF) audio signals to and from the audio interface; and
a processing unit in communication with the audio interface to convert packets to and from RF signals for transmission through the audio interface to and from the communication unit.

2. The system of embodiment 1, wherein the processing unit includes a protocol stack comprising a plurality of layers through which a packet is transmitted to enable ultrasonic communication to and from the communication unit.

3. The system of embodiment 2, wherein each layer in the protocol stack communicates with an adjacent lower or upper layer through an exchange of packets, each packet including a header and a payload.

4. The system of any of embodiments 2-4, wherein the protocol stack includes a physical layer, a medium access control layer, and an application layer.

5. The system of embodiment 4, wherein the application layer is operative to encapsulate a payload into a byte stream, the payload selected from a text file, a data file, an audio file, a sound file, an image file, a graphic file, a photographic file, and a video file.

6. The system of any of embodiments 4-5, wherein the medium access control layer is operative to implement a data transmission protocol between the electronic device and a further electronic device.

7. The system of embodiment 6, wherein the data transmission protocol is a sliding window protocol.

8. The system of embodiment 7, wherein the data transmission protocol is a stop-and-wait automatic repeat-request protocol, a go-back-N automatic repeat-request protocol, or a selective repeat automatic repeat-request protocol.

9. The system of any of embodiments 1-8, wherein the processing unit comprises one of:
a component of an operating system of the electronic device;
an application operative to provide service to a further application on the electronic device; or
a precompiled stand-alone library residing on the electronic device for communication with the further application on the electronic device.

10. The system of any of embodiments 1-9, wherein the processing unit comprises a physical layer operative in a transmission chain to construct one or more physical layer frames and to convert the one or more physical layer frames into an audio track for transmission via the audio interface to the communication unit.

11. The system of embodiment 10, wherein the physical layer is operative to encode an outgoing signal with an orthogonal frequency division multiplexing (OFDM) scheme in the physical layer frame.

12. The system of any of embodiments 10-11, wherein the physical layer is operative to provide a physical layer frame comprising a preamble and a pause interval followed by a number of zero-padding orthogonal frequency division multiplexing (OFDM) frames interleaved with guard intervals.

13. The system of any of embodiments 10-12, wherein the processing unit is operative to encode sampled signals to construct an audio track from the physical layer frame to be played by the audio interface.

14. The system of embodiment 13, wherein the processing unit is operative to encode sampled signals using an analog to digital converter.
15. The system of any of embodiments 13-14, wherein the processing unit is operative to encode sampled signals using a pulse code modulation audio encoding scheme.
16. The system of any of embodiments 10-15, wherein the physical layer is operative to interact with an audio encoding scheme provided by an application programming interface of the electronic device to construct the audio track.
17. The system of any of embodiments 1-16, wherein the processing unit is operative to construct a physical layer frame by encoding bits to symbols, interleaving data symbols with pilots and zero-padding, performing an Inverse Fast Fourier Transform operation to convert to a time domain representation, adding a preamble at a beginning of the physical layer frame and a guard interval between frames, upconverting to a carrier frequency, and encoding sampled signals to generate an audio track for transmission over the audio interface.
18. The system of any of embodiments 1-17, wherein the processing unit comprises a physical layer operative in a reception chain to convert an incoming audio signal from the communication unit via the audio interface to a physical layer frame.
19. The system of embodiment 18, wherein the physical layer is operative to convert the audio signal into one or more physical layer blocks and store each block in memory with an identification to enable each physical layer block to be accessible upon request.
20. The system of embodiment 19, wherein the physical layer is operative to enable an observer to register to receive notice of availability of a requested one or more physical layer blocks.
21. The system of any of embodiments 18-20, wherein the physical layer is operative to detect an incoming packet from the audio interface using a detection scheme, the detection scheme comprising searching for a marker sequence within a preamble of a physical layer frame by:
    searching for a cross-correlation value V greater than a predetermined threshold $\theta_c$ within a correlation period T,
    if V greater than the predetermined threshold $\theta_c$ is found, searching for a maximum correlation value V* within the correlation period, and
    determining an identified block and a sample index within the identified block that corresponds to the maximum correlation value V*.
22. The system of embodiment 21, wherein the physical layer is further operative to:
    determine a start block, a start index within the start block, an end block, and an end index within the end block for an identified physical layer frame; and
    provide a byte array comprising samples between the start index and the end index to a module requesting the physical layer frame.
23. The system of any of embodiments 18-22, wherein the physical layer is operative to convert received symbols in an incoming signal to bits by downconverting to a baseband frequency, providing a channel estimation, and mapping symbols to bits.
24. The system of embodiment 23, wherein a mapping scheme is a phase-shift-keying (PSK) modulation scheme or a quadrature amplitude modulation scheme.
25. The system of any of embodiments 1-24, wherein the processing unit includes an application programming interface operative to communicate with a further application running on the electronic device, wherein the further application is a texting application, an audio application, a video application, a mapping application, a navigation application, a location tracking application, a geographic information system application, or a global positioning system application.
26. The system of any of embodiments 1-25, wherein the one or more ultrasonic transducers comprises a single ultrasonic transducer, and the communication unit further includes a switch operative to switch the single ultrasonic transducer between transmitter and receiver operations.
27. The system of embodiment 26, wherein the audio interface includes a microphone channel to receive data from the ultrasonic transducer, a channel to transmit data to the ultrasonic transducer, and a channel in communication with the switch.
28. The system of any of embodiments 1-27, wherein the ultrasonic transducer has a directional beam pattern.
29. The system of any of embodiments 1-28, wherein the ultrasonic transducer is omnidirectional in a plane.
30. The system of any of embodiments 1-29, wherein the communication unit includes a power amplifier in a transmission chain between the audio interface and the one or more ultrasonic transducers, and a pre-amplifier in a reception chain between the audio interface and the one or more ultrasonic transducers.
31. The system of any of embodiments 1-30, wherein the one or more ultrasonic transducers have an operational frequency range between 1 Hz and 200 kHz
32. The system of any of embodiments 1-31, wherein the system has a packet error rate of $1 \times 10^{-3}$ or less.
33. The system of any of embodiments 1-32, wherein the system has a bit error rate of $1 \times 10^{-4}$ or less.
34. The system of any of embodiments 1-33, wherein the system has a throughput of 3 kbit/s or greater.
35. The system of any of embodiments 1-34, wherein the system has an ultrasonic transmission range under water of at least 200 m.
36. The system of any of embodiments 1-35, wherein the electronic device is a smartphone, a laptop computer, a tablet computer, a mobile device, a hand-held device, a wireless device, a wearable device, an amphibious device, a water-resistant device, or a waterproof device.
37. The system of any of embodiments 1-36, wherein the audio interface is an auxiliary interface of the electronic device.
38. An electronic device, comprising the underwater acoustic communication system of any of embodiments 1-37.
39. A method of transmitting underwater acoustic signals to and from an underwater electronic device, comprising:
    providing the underwater acoustic communication system of any of embodiments 1-38;
    sending or receiving an underwater ultrasonic acoustic signal to or from the electronic device through a water communication channel.
40. A communication unit for an underwater acoustic communication system comprising:
    one or more ultrasonic transducers to transmit and receive underwater ultrasonic acoustic signals through a water communication channel; and
    a connection to an audio interface of an underwater electronic device to send and receive radio frequency (RF) audio signals to and from the audio interface.
41. The communication unit of embodiment 40, further comprising a power amplifier in a transmission chain between the connection to the audio interface and the one or more ultrasonic transducers, and a pre-amplifier in a reception chain between the connection to the audio interface and the one or more ultrasonic transducers.

42. A system for enabling underwater acoustic communication in an underwater electronic device, comprising:
a processing unit in communication with an audio interface of the underwater electronic device comprising a protocol stack comprising a plurality of layers through with a packet is transmitted to enable ultrasonic communication to and from the underwater electronic device, the protocol stack including a physical layer, a medium access control layer, and an application layer.

43. The system of embodiment 42, wherein the processing unit is reconfigurable.

DESCRIPTION OF THE DRAWINGS

Reference is made to the following detailed description taken in conjunction with the accompanying drawings in which.

DETAILED DESCRIPTION

Figure 1:
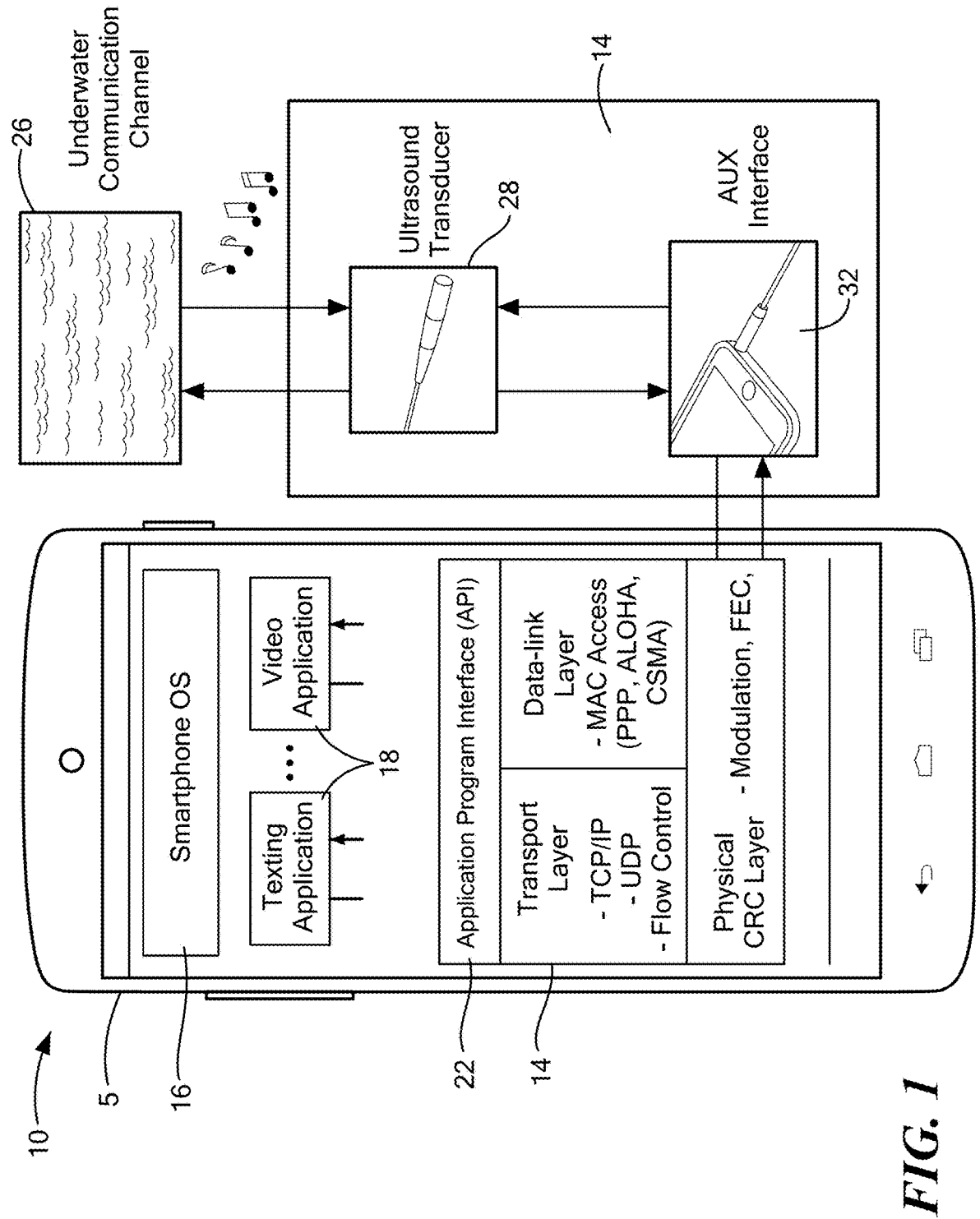
FIG. 1 is a schematic illustration of an architectural overview of embodiments of an underwater acoustic communication system.

An underwater acoustic communication system for an underwater electronic device is provided and a method of transmitting underwater acoustic signals to and from an underwater electronic device are provided. An underwater acoustic communication system can include a communication unit employing one or more ultrasonic transducers to transmit and receive underwater ultrasonic acoustic signals through a water communication channel. The communication unit can be connected to an audio interface of the underwater electronic device to send and receive radio frequency (RF) audio signals to and from the audio interface. The communication system can include a processing unit in communication with the audio interface to convert packets to and from RF signals for transmission through the audio interface to and from the communication unit.

More particularly, in some embodiments, the communication system can use an acoustic transducer, along with other appropriate hardware, to transform a radio frequency (RF) wave generated by the mobile device into an acoustic wave that can be transmitted underwater. The communication system can provide a fully-software-defined network protocol stack that can provide end-to-end underwater acoustic communication. In some embodiments, the system can implement an orthogonal frequency division multiplexing-based communication system. In some embodiments, the communication system can be implemented on a mobile device with limited or minimal additional hardware. In some embodiments, the communication system can use the auxiliary (AUX) interface of a mobile device, such as a smartphone. In some embodiments, the communication system can transform a mobile device such as an off-the-shelf smartphone into an ultrasonic software "radio." In some embodiments, the communication system can achieve reliable transmission by implementing a fully-software-defined network stack to provide end-to-end reliable underwater communication by sending and receiving information through the AUX interface of the mobile device.

To enable research, development and distribution of systems and apps for waterproof mobile devices such as smartphones, the mobile devices need to support underwater communication. However, due to water's high permittivity and electrical conductivity, and thus the strong attenuation of electromagnetic waves, traditional techniques such as cellular or Wi-Fi are impractical for mobile device underwater communication.

Making amphibious mobile devices communicate underwater is extremely challenging for a multitude of reasons. Underwater acoustic transmissions experience severe path loss and multipath effect, Doppler spread effect, limited bandwidth, and fast time-varying channel. For these reasons, embodiments of the present system use techniques based on software-defined radios (SDRs) to enable fast adaptation to the time-varying channel. An SDR is a radio communication system in which components that have been typically implemented in hardware (e.g. mixers, filters, amplifiers, modulators/demodulators, detectors, etc.) are instead implemented in software on a personal computer or embedded system.

Another significant challenge is that, unlike in platforms such as Universal Software Radio Peripherals (USRP) and similar SDRs, software development kits (SDKs) for implementing efficient and effective SDRs on mobile devices such as smartphones are still in an experimental stage and are applicable to a limited number of devices and/or operating system (OS) software versions. Thus, the software handling the processing and transmission of information, including the full network stack, must be implemented and tested from the ground up. Furthermore, customized, lightweight network protocols and transmission schemes must be tailored and implemented to allow a maximum level of efficiency in transmission and reception. As opposed to existing software-defined frameworks for underwater networks, embodiments of the present system can also encompass end-to-end reliability to implement apps such as texting and video streaming.

Embodiments of an underwater acoustic communication system are provided to address these gaps. Embodiments of the system can provide for end-to-end mobile device underwater communication. The system employs a software component, which can be a fully-software-defined underwater networking stack for mobile devices, and a hardware component, which can realize an ultrasonic front-end to transform a mobile device into an acoustic software radio, and leverages the auxiliary (AUX) interface of the mobile device to send packets through the underwater acoustic channel.

Different from existing work, embodiments of the present system provide a complete system for end-to-end underwater communication for mobile devices, both in its hardware and software components. Embodiments are provided that can implement a full communication stack between two mobile devices.

Underwater Acoustic Communication

Acoustic communication has been used as a transmission technology for underwater networked systems. Electromagnetic waves propagate over long distances through conductive salty water only at extra low frequencies (30 to 300 Hz), which require large antennas and high transmission power. Due to the physical properties of the propagation medium, underwater acoustic signals suffer from severe transmission loss, noise, multipath propagation, high delay, Doppler spread. These effects are summarized below:

Transmission Loss.

Transmission loss is mainly caused by two phenomena: geometric spreading loss and attenuation. Transmission loss for a signal of frequency f (expressed in kHz) over a transmission distance d (expressed in meters) can be expressed in decibels (dB) as $TL(d, f)_{dB} = k \cdot 10 \cdot \log d + d \cdot \alpha(f) + A$, where k is the spreading factor, which describes the geometry of propagation, $\alpha(f)$ (dB/m) is the absorption coefficient, and A (dB) is the so-called transmission anomaly which accounts for factors other than absorption including multipath propagation, refraction, diffraction and scattering. The main kind of spreading is spherical, meaning the acoustic pressure falls off proportionally to the surface area of a sphere. Attenuation can be mainly attributed to absorption, caused by conversion of energy of the propagating acoustic wave into heat. According to Fisher and Simmons, absorption depends on frequency, temperature, and water pressure (i.e., depth). (F H Fisher and V P Simmons. Sound absorption in seawater. *The Journal of the Acoustical Society of America* 62, 3 (1977), 558-564.)

Noise and Multipath.

The main causes for noise in the acoustic underwater channel are due to man-made activities, for example, machinery noise (pumps, reduction gears, power plants), and by natural events, for example, seismic activities and hydrodynamics (waves, currents, tides, rain, and wind). On the other hand, multipath arises from either wave reflections from the surface, bottom and other objects, or wave refraction caused by sound speed variations with depth (acoustic waves always bend towards regions where the propagation speed is lower). Multipath propagation can severely deteriorate the acoustic signal, as it generates inter-symbol interference (ISI). The multipath geometry depends on the link configuration. Vertical channels typically have little time dispersion, while horizontal channels may show long multipath spreads. The extent of spreading is highly dependent on depth and distance between transmitter and receiver.

High Delay.

According to Robert, the propagation speed of an acoustic signal in water is five orders of magnitude lower than electromagnetic signal propagation in air, and varies between 1450 to 1540 m/s. (J Urick Robert. *Principles of underwater sound.* New York: McGraw-Hill Book Company (1983).) The delay variance, caused by time-varying multipath propagation, may impact protocol design since it may prevent accurate estimation of the round trip time (RTT).

Doppler Spread.

Doppler spread occurs as a result of Doppler shifts caused by motion at the source, receiver, and channel boundaries. Mobile nodes exhibit a Doppler shift proportional to their relative velocity, while currents and tides can also force moored nodes to move, introducing slight Doppler shifts. In addition to this, tidal and water currents can introduce Doppler shifts that create surface and volume scatterers relative to a fixed receiver. The Doppler spread can be represented in time by the inverse of the coherence time of the channel.

Software-Defined Radios (SDRs).

Briefly, SDRs are generally defined as radios where frequency band, air interface protocol and functionality can be upgraded with software updates instead of a complete hardware replacement. The peculiar characteristic of SDRs is that they are capable of being re-programmed or reconfigured to operate with different waveforms and protocols through dynamic loading of new waveforms and protocols. Furthermore, protocol characteristics at the data-link, network, and transport layers are completely defined in software and may be changed dynamically at runtime depending on the system's needs. This has several advantages, including the ease of portability of the SDR software to different hardware platforms, which in turn decreases development and testing costs as well as time-to-market of the radio technology. The SDR technology uses software modules that run on a generic hardware platform including digital signal processing (DSP) processors as well as general purpose processors to implement the radio functions to transmit and receive signals. Usually, SDR implementations are based on a combination of FPGA/DSP or FPGA-only solutions in alliance with software-defined physical and data-link layer for reaching the trade-off between parameter adaptation and performance.

Architectural Design of an Underwater Acoustic Communication System

Embodiments of the architecture of the underwater acoustic communication system described herein can take into consideration several aspects:

In some embodiments, the communication system can offer a set of application programming interfaces (APIs) that both obfuscate the implementation details at the physical, data-link, and network layers and guarantee end-to-end reliable transmission and reception of information. In some embodiments, the possibility of specifying Quality of Service (QoS) constraints such as delay and throughput can be provided. In this manner, embodiments of the system can enable mobile device apps (for example, Twitter, Facebook) to readily interface with the system to communicate underwater.

In some embodiments, the communication system can provide reconfiguration capabilities and networking agility at all levels of the network protocol stack, to adapt to the harsh underwater channel environment. In some embodiments, the architecture can also facilitate new protocol designs. In some embodiments, the system can employ a modular architecture, which can be amenable to hardware and/or software enhancements.

In some embodiments, the communication system can employ software modules and hardware front-ends that are platform-independent, meaning that they can communicate with each other through APIs that are unaware or substantially unaware of the underlying operating system (OS) implementation. This enables embodiments of the system to be implemented on a variety of commercially available mobile devices and without using dedicated, ad-hoc hardware that may be employed only by a single mobile device technology.

FIG. 1 illustrates an architectural overview of embodiments of the communication system 10 on an electronic device 5. The electronic device is illustrated as a mobile device, such as a smartphone in FIG. 1; however, it will be appreciated that the communication system can be implemented on many types of electronic devices such as, without limitation, a smartphone, a laptop computer, a tablet computer, a mobile device, a hand-held device, a wireless device, a wearable device, an amphibious device, a water-resistant device, or a waterproof device. In some embodiments, the communication system can be logically implemented as a processing unit 12, implemented as a software module, and a communication unit 14 housing the hardware components. In some embodiments, the software module can be part of the operating system (OS) 16 of the electronic device 5. In some embodiments, the software module can reside as a standalone library that can be distributed as precompiled for each mobile device platform and plugged into other apps 18 requesting underwater communications. In some embodiments, the software module can be implemented as an app that provides services to other apps currently running on the mobile device, if the apps are not completely sandboxed (e.g., content providers in Android).

Irrespective of the implementation, from a logical standpoint each app requesting underwater communication can interact with the software module of the communication system with simple-to-use APIs 22 that can provide either reliable or best-effort communication. This API can be considered similar in purpose to the standard TCP/UDP sockets, and can also include QoS requirements such as delay and throughput requested.

Embodiments of the communication system 10 can also implement a fully-functional networking stack which complies with the International Standard Organization (ISO) Open Systems Interconnection (OSI) reference model. Thus, in some embodiments, network layers can be entirely implemented in software. The network layers can be completely independent from each other, in the sense that the implementation details of one layer are obscure to the other layers. The network layers can be made to communicate with each other through APIs that are common to every layer. Information between layers can be exchanged through packets, which are in general composed of a header, a trailer, and a payload. The length and payload of each packet depends on the given network layer, and may change over time depending on the networking requirements, in accordance with the software-defined networking paradigm.

Operations performed by each network layer can include (i) encapsulate and decapsulate packets coming from upper and lower layers; (ii) perform operation to the decapsulated or encapsulated packet; and (iii) send the processed packet to the lower or upper level of the network stack. Implementation of each network layer, the APIs for interlayer communication, and the packet structure for each network layer in the application are described in more detail below.

After being processed by the physical layer, packets are ready to be transmitted over the underwater channel 24. The communication unit 14 houses hardware components, include one or more ultrasonic transducers 28 and an audio interface 32 between the ultrasonic transducer(s) and the processing unit or software module 12 to generate a radio frequency (RF) signal, which in turn can be converted to a mechanical wave by an acoustic transducer and then transmitted over the underwater communication channel. In some embodiments, the audio interface can be an audio auxiliary (AUX) port of an electronic device. Similar to the network layers, each one of the operations involved in the conversion of packets into an RF signal (i.e., mapping, modulation, coding, up-conversion, and so on) can be done in software in order to allow maximum flexibility in terms of what wave is ultimately sent over the channel. The communication system architecture need not specify which kind of acoustic transducer should be used.

Implementation of the Communication System

Embodiments of the communication system can be implemented as described as follows:

Transmission (TX) Chain.

Figure 2:
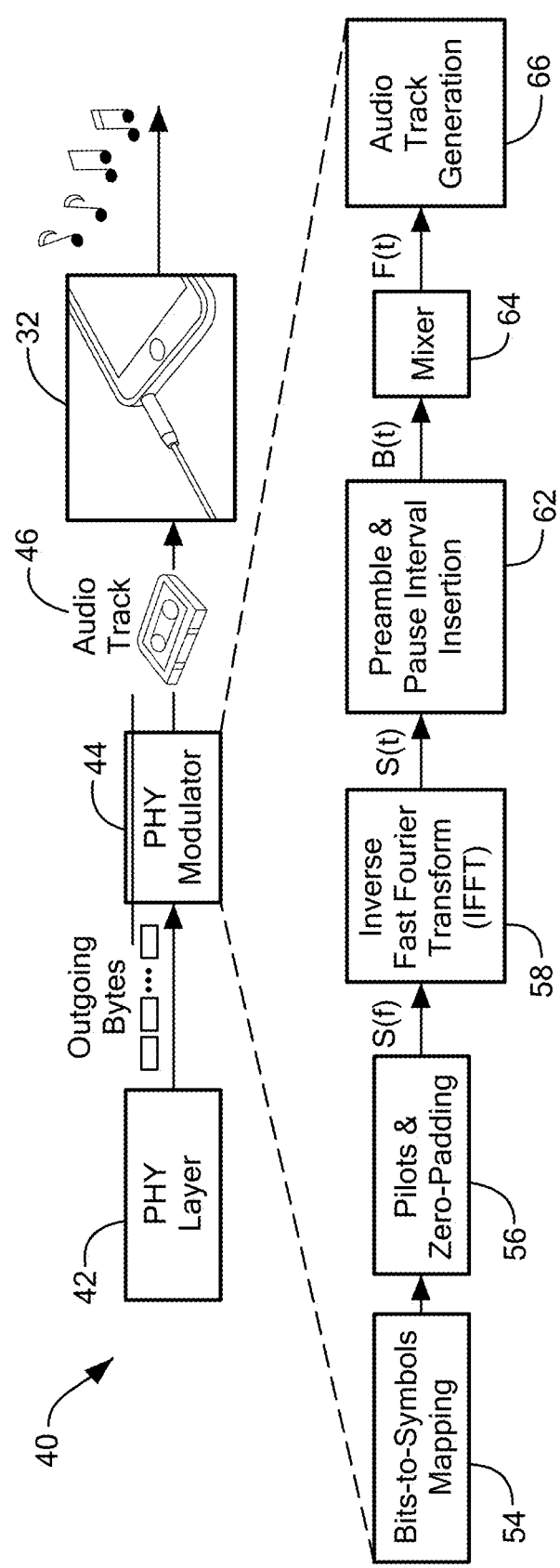
FIG. 2 is a block diagram of embodiments of modules involved in a transmission (TX) chain in the underwater acoustic communication system.

FIG. 2 illustrates an embodiment of a transmission (TX) chain 40 of the communication system. The TX chain has the purpose of converting a frame on a physical (PHY) 42, via a module PHYModulator 44, into an audio track 46 that can be played on the audio interface 32, such as mobile device AUX interface. The PHYModulator module can effect such conversion via several operations. The module can provide a bits-to-symbols mapping. In some embodiments, a Zero-Padding Orthogonal Frequency Division Multiplexing (ZP-OFDM) modulation scheme can be employed, which is robust against frequency selective channels with long delay spread and can support multiple bit-to-symbol mappings, for example, Binary or Phase Shift Keying (BPSK or QPSK), which allows flexibility in the tradeoff between robustness and bit rate.

Figure 3:
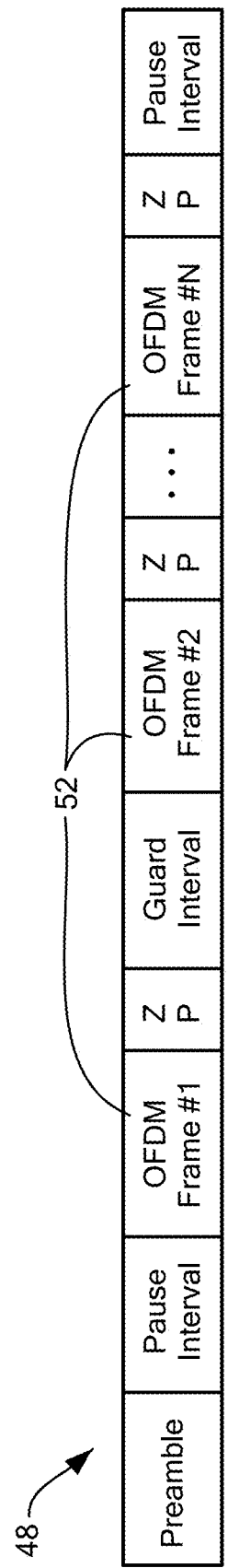
FIG. 3 is an embodiment of a Physical (PHY) frame structure in the underwater acoustic communication system.

FIG. 3 shows an embodiment of a format of a physical layer (PHY) frame 48. The PHY frame can include up to N ZP-OFDM frames 52. Each frame uses K subcarriers, with $K_P$ subcarriers used as pilot subcarriers, $K_D$ used for data, and $K_N$ selected as null subcarriers. The number N of ZP-OFDM frames does not need to be fixed, but can vary according to the payload length of upper layers.

In some embodiments, a first operation 54 of the TX chain is to encode bits to symbols according to the specific mapping. In operation 56, a vector S(f) containing the information for each ZP-OFDM subcarrier is then filled with the data symbols interleaved with pilots and zero-padding. Afterwards, an Inverse Fast Fourier Transform (IFFT) operation 58 is performed on S(f) to produce a representation S(t) in the time domain of the S(f) vector. At operation 62, a guard interval is added between each OFDM frame and a preamble is encoded with, for example, BPSK and appended at the beginning of the PHY frame along with a pause interval, to allow frame synchronization by the receiving mobile device.

Figure 4:
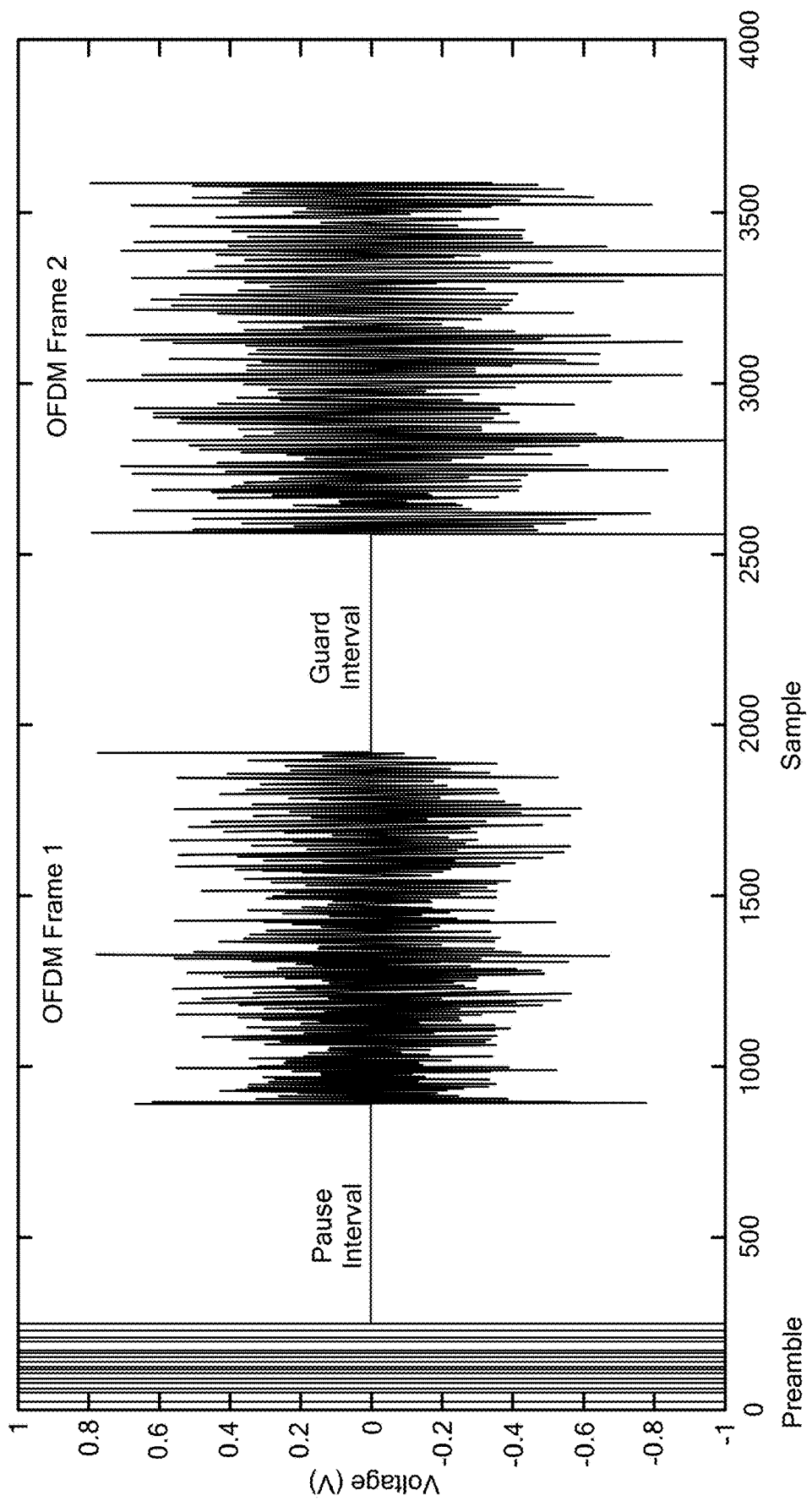
FIG. 4 is an example of a PHY frame encoding an APP level string employing the PHY frame structure of FIG. 3.

The B(t) vector is then unconverted through a software mixer 64 to the carrier frequency. Finally, an audio track of the vector F(t), representing the signal to be sent, is constructed using a suitable audio encoding operation 66. In some embodiments, an analog to digital converter can be used to encode sample signals to construct an audio track. In some embodiments, the AudioTrack API provided by Android on a smartphone can be used. AudioTrack converts each sample to a 16-bit signed integer by using Pulse Code Modulation (PCM), which is a widely used audio encoding scheme. Such PCM-encoded signal can then be transmitted over the auxiliary (AUX) interface of the mobile device by using the AudioTrack module. FIG. 4 shows an example of a PHY frame encoding the APP level string "This is a message", as transmitted over the AUX interface.

Reception (RX) Chain.

Figure 5:
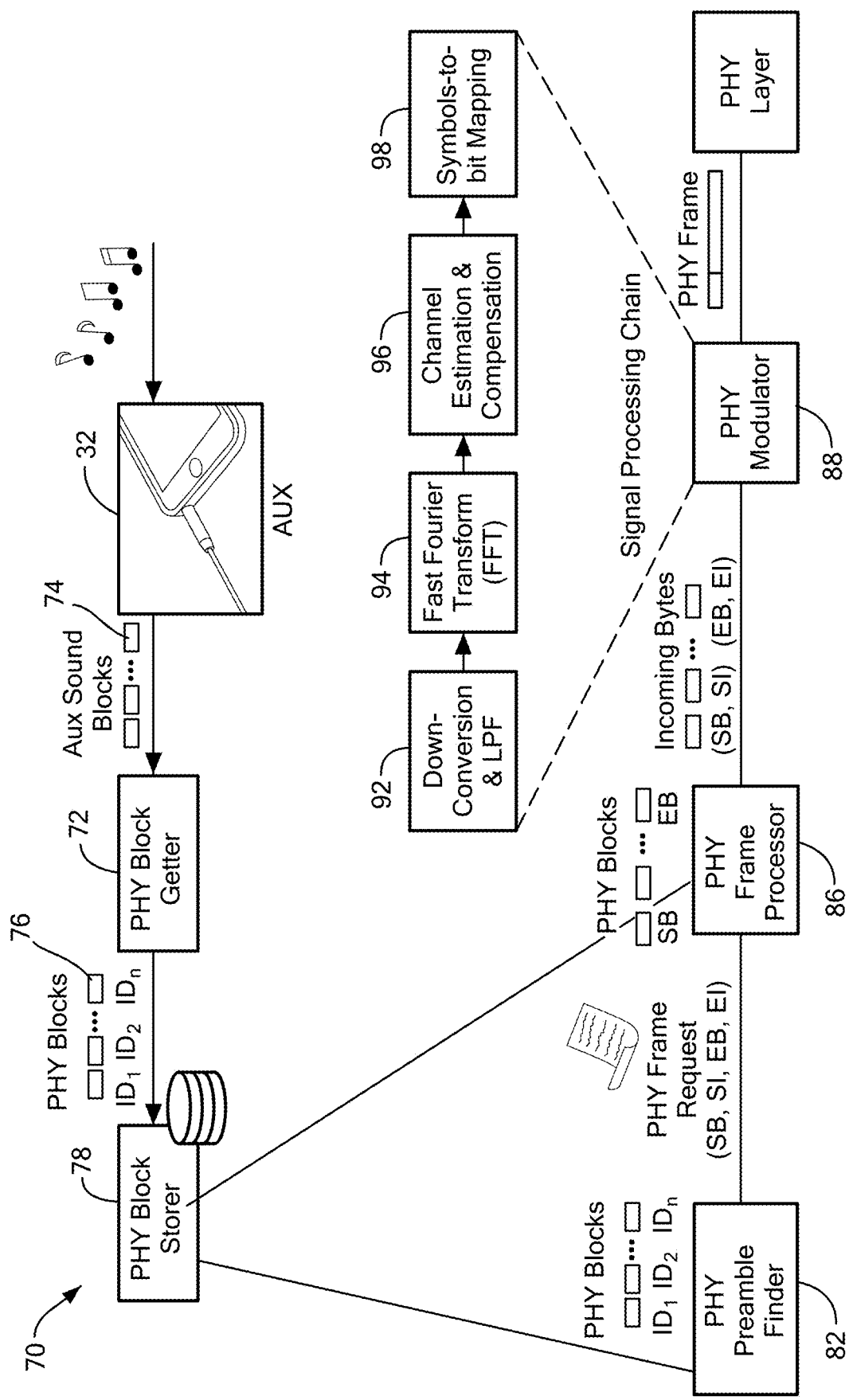
FIG. 5 is a block diagram of embodiments of modules involved in a receive (RX) chain in the underwater acoustic communication system.

FIG. 5 illustrates a reception (RX) chain 70 of the communication system. The RX chain has the purpose of detecting an incoming PHY packet from the audio interface, and reconstructing the PHY packet and send it to the PHY layer for further processing. In some embodiments, the RX chain operations can be implemented asynchronously, in the sense that the modules are not synchronized with each other and the flow of operations is handled by leveraging an Observer design pattern. Any suitable scheme for handling events and object state changes can be used.

PHY Block Getter.

In some embodiments, a module 72, termed PHY-BlockGetter, can be tasked with receiving audio from the audio interface, for example, by using the AudioRecord API provided by Android. A thread inside this module can continuously read from the audio interface audio blocks 74 of, for example, size B=256 bytes, can convert each of the 256 samples from 16-bit PCM to double, and can create a data structure, termed PHYBlock, where each block 76 is represented by an identification (ID) number and a corresponding double array storing the samples in memory.

PHY Block Storer.

Since the RX chain is asynchronous, a module 88, termed PHYBlockStorer, wishing to use PHYBlocks 76 must be able to access them whenever they need and not only as soon as they become available. To this end, PHYBlockStorer can be tasked with providing other modules with asynchronous access to PHYBlocks. Specifically, a module interested in processing PHYBlocks 76 can register to PHYBlockStorer 78 and get inserted into an Observer list. A module can register as an Observer for receiving every PHYBlock or receiving a specific set of PHYBlocks. Therefore, as soon as a PHYBlock or a specific set of PHYBlocks is available, each Observer is signaled of the presence of the requested PHYBlock, so it can be received and processed. Since memory is limited, the queue that stores PHYBlocks can be emptied as soon as it reaches a given number of PHYBlocks. This is usually not a concern as the processing on modern mobile devices is fast enough to handle the reception of PHYBlocks.

PHY Preamble Finder.

One of the challenges in the RX chain 70 is to detect incoming packets among the PHYBlocks 76 received from the audio interface, called frame synchronization. In practical terms, if a known sequence M, called marker, and another sequence S in which M is inserted starting at some index j, are known, how is such index computed only knowing M in advance and receiving S one PHYBlock (i.e., 256 samples) at a time?

In some embodiments, this goal can be achieved using a cross-correlation algorithm, which shifts the M sequence in time and calculates how well S and M match (by multiplying point by point and summing) at each shift. The intuition behind the algorithm is that when such sum is small, it means that S and M are not much alike. On the other hand, when the sum is large, many terms are similar. Thus, cross-correlation is a simple yet effective form of pattern matching, which is useful for aligning signals in time. An example can be found in Johnson et al., 2011. (C. Richard Johnson Jr, William A. Sethares, and Andrew G. Klein, *Software receiver design: build your own digital communication system in five easy steps*; Cambridge University Press (2011).)

As an example, let M be a "marker" sequence known to both transmitter and receiver. Then the problem reduces to performing cross-correlation between S and M and finding the index j inside S where the cross-correlation is maximum. In some embodiments of the communication system, the preamble of the PHY Frame can be used as the "marker" sequence M To maximize the chance of detecting the PHY Frame, the marker M needs to be a maximum-length pseudo-noise (PN) sequence, which has the property of having as auto-correlation (i.e., cross-correlation between the sequence and itself) a Kronecker delta function. More formally, by letting $M[k+j]_N$ define a circular shift of M and the sequence M be represented in the domain $\{-1, 1\}$, $$C_M(j) = \frac{1}{N}\sum_{k=1}^{N} M[k] \cdot M[k+j]_N = \begin{cases} 1 & j=0 \\ -1/N & \text{otherwise} \end{cases} \quad (1)$$

Implementing the cross-correlation algorithm involves additional challenges and constraints peculiar to mobile device underwater networking. First, the cross-correlation algorithm has $O(n^2)$ computational complexity when the two signals are both of size n. Moreover, the cross-correlation algorithm is applied to every PHYBlock 76. As an estimation of the amount of operations involved, consider that with a sampling rate of 44,100 samples/sec (i.e., the audio sampling rate), about 172 PHYBlocks need to be processed per second. With each PHYBlock containing 256 samples, that gives at least 256*256*172=11,272,192 operations/sec. To this end, the cross-correlation algorithm discussed in Johnson et al. has been tested on a Samsung Galaxy S7 and a Galaxy S6. Although the newer smartphone was able to handle such computation, the older device was not able to execute the algorithm fast enough, ultimately causing a memory overflow. Second, the strong multipath effect induced by the underwater channel implies that multiple copies of the PHYFrame (and thus, of the preamble) can be received with little delay between each other. This can cause strong correlation peaks at instants that are not related to the main PHYFrame signal.

To address these factors, in some embodiments, a new cross-correlation algorithm is provided, as follows:

Cross-correlation (multiplication point-to-point and then sum) is performed every T samples, with T defined as the correlation period. Let the value of the cross-correlation be V. Whenever V is greater than a threshold $\theta_c$, then perform a cross-correlation for each sample in the correlation period. Otherwise, move on to the next correlation period.

Let $V_1 \ldots V_T$ be the correlation values inside the correlation period under consideration. Choose as a starting point of a new frame the maximum of these values, to avoid the effect of multipath, if greater than a threshold $\theta_f$. More formally, $V^* = \max_{1 \le x \le T} V_x$, such that $V_x > \theta_f$. Finally, the algorithm returns S* and B*, respectively, the sample index corresponding to V* and the BlockID containing S*.

Figure 6:
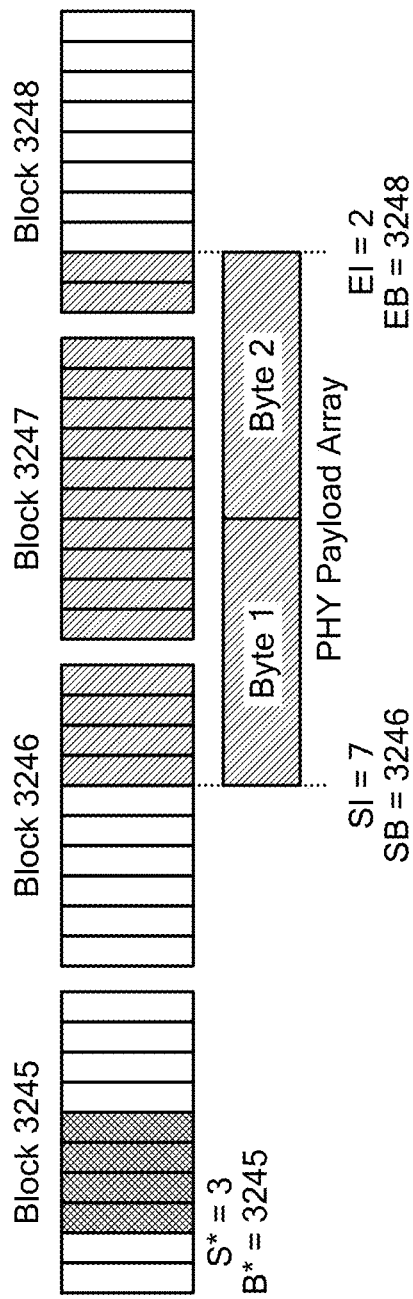
FIG. 6 is an example of frame synchronization and frame processing according to embodiments of the underwater acoustic communication system.

FIG. 6 illustrates an example of frame synchronization and frame processing in the communication system. Assume the preamble is long 4 samples, and it is detected at index S*=3 of block B*=3245. As soon as the cross-correlation algorithm detects a preamble, a module 82, termed PHY-PreambleFinder, builds a PHYFrameRequest 84 object that gets submitted to a PHY frame processor module 86, termed PHYFrameProcessor, as explained below.

PHY Frame Processor.

In some embodiments, this module 86 asynchronally processes PHY Frame Requests 84 in first in first out (FIFO) order. For each PHYFrameRequest, the module produces as output a byte array corresponding to the payload of the corresponding PHY Frame. Each PHYFrameRequest 84 contains four values: start block (SB) and start index (SI), and end block (EB) and end index (EI). These four quantities are computed by the PHYPreambleFinder module 82 whenever the cross-correlation algorithm detects the start of a new PHY Frame. To construct the bytes that make up the PHY Frame, the PHYFrameProcessor 86 requests the PHYBlocks 76 in the interval [SB, EB] by becoming an Observer of PHYBlockStorer 74. As soon as the requested PHYBlocks become available, PHYFrameProcessor 86 is signaled and the construction of the PHY Frame begins. PHYFrameProcessor constructs the byte array by filling it up with all the samples between (SB, SI) and (EB, EI). This array is finally passed to the PHY Modulator 88, termed PHYModulator.

FIG. 6 shows an example of frame processing in the communication system. In this example, assume that the PHY Frame has a preamble long 4 samples, a pause interval long 10 samples, and only one OFDM frame of size 16 samples, corresponding to 2 bytes of PHY payload. (These sizes are chosen purely for graphical reasons.) As soon as blocks 3246 to 3248 become available, PHYFrameProcessor 86 fills up the PHY payload byte array and sends it to PHYModulator 88 for processing.

PHY Modulator.

The purpose of PHYModulator 88 is to implement the signal processing chain needed to convert the received symbols to bits. In some embodiments, in a first operation 92, the samples are down-converted to baseband by mixing with a cosine and sine, and then low-pass filtered with a second-order Butterworth filter. A Fast Fourier Transform operation 94 converts to the frequency domain. Then, in operation 96, the channel is estimated by leveraging pilot tones, and equalized by using zero-forcing (ZF). After that, the symbols in the complex space (represented by the in-phase and quadrature portion of the original signal) are mapped to bits according to the chosen mapping (BPSK or QPSK) in operation 98. The PHY Frame payload is then passed to the PHY Layer for further processing.

Software-Defined Network Stack of Communication System.

Embodiments of a software-defined network stack for the communication system can be described in the following.

General Concepts.

In some embodiments of the communication system, network layers process and communicate with other layers through Packet objects. Each Packet contains a header, a trailer, and a payload, implemented as byte arrays for the sake of generality. Whenever an electronic device app requests underwater networking, one or more Packets are generated by the electronic device app. Packet objects go down through the network stack and are then transmitted by the TX chain of communication system, as explained above in the description of the transmission (TX) chain. Similarly, the audio blocks are processed and merged into a PHY Frame by the RX chain of the communication system, as explained above in the description of the reception (RX) chain. Then, a new Packet is generated by the PHY layer and sent up through the network stack, to be finally received by an app.

Figure 7:
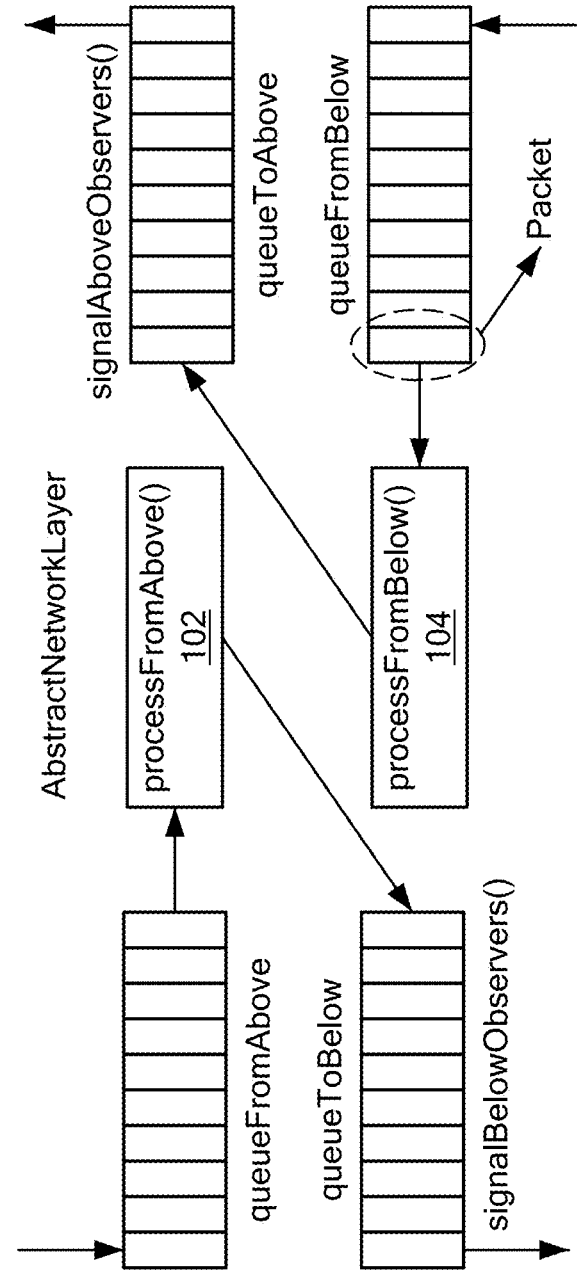
FIG. 7 is an example of a block scheme of AbsractNetworkLayer module in embodiments of the underwater acoustic communication system.

FIG. 7 shows an embodiment of a block scheme of an AbstractNetworkLayer; each concrete network layer in the communication system has to extend from this class. Since most of the functionalities of a network layer are common between layers, class inheritance allows advantages such as extensive code reuse and ease of development of new network layers.

The way a Packet is processed by each network layer depends on whether it is going down or up. In the former case, it gets processed by a processFromAbove( ) function 102; in the latter case, it gets processed by a processFromBelow( ) function 104. These two functions can be implemented by each concrete network layer, as they actually define the behavior of the layer itself. As soon as Packets are processed, they are enqueued into queueToBelow or queueToAbove. A thread running inside the network layer can take care of sending each processed packet to its next layer by enqueuing them into queueFromAbove or queueFromBelow, again using the Observer design pattern. In some embodiments, the queues inside AbstractNetworkLayer are subclassed from the BlockingQueue class in Java, so that the threads block when a full and empty queue is encountered.

Implementation.

Figure 8:
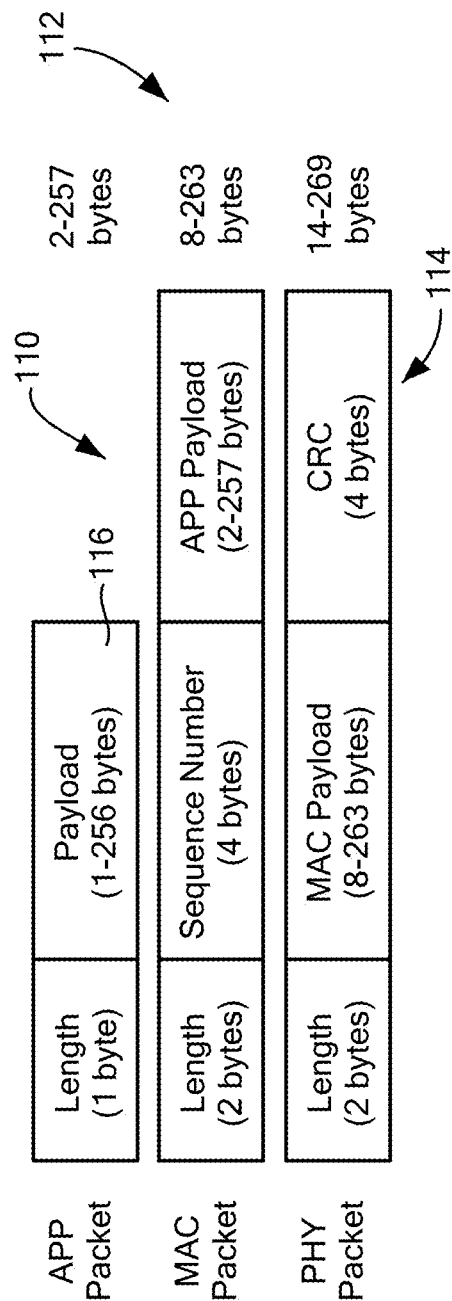
FIG. 8 is an example of a software-defined network stack in embodiments of the underwater acoustic communication system.

The network stack implemented for the communication system can be simple, and can comprises an application (APP) layer 110, medium access control (MAC) layer 112, and physical (PHY) layer 114. In details, the purpose of the APP layer is to encapsulate a payload coming from an app. The payload may be, for example, a string encoded in ASCII or Unicode in case of a texting app, or an object such as a photograph or an MP3 file. In general, the payload may be any object that can be serialized into a stream of bytes. See FIG. 8.

The MAC layer 112 can have the task of ensuring reliable communication between the sender and the receiver. Considering point-to-point communication, the sender can utilize a stop-and-wait automatic repeat-request (ARQ) mechanism. Specifically, in this scheme, the sender sends one frame at a time. After sending each frame, the sender does not send any further frames until it receives an acknowledgement (ACK). After receiving a valid frame, the receiver sends an ACK. If the ACK does not reach the sender before a certain time, known as the timeout, the sender sends the same frame again. The timeout countdown is reset after each frame transmission. Note that stop-and-wait is a special case of the general sliding window protocol with transmit and receive window sizes equal to one and greater than one, respectively. An ACK packet is a MAC layer packet with no APP payload and with negative sequence number, to distinguish it from a regular packet. Although a stop-and-wait ARQ mechanism does not require a sequence number, a sequence number can be included in some embodiments of the communication system to allow extension to more complex ARQ schemes. The PHY layer implements a cyclic redundancy check (CRC) mechanism to check for package corruption by the underwater channel. If the packet has not been compromised, it is passed on to the MAC layer; otherwise it is discarded.

Hardware Implementation

Figure 9:
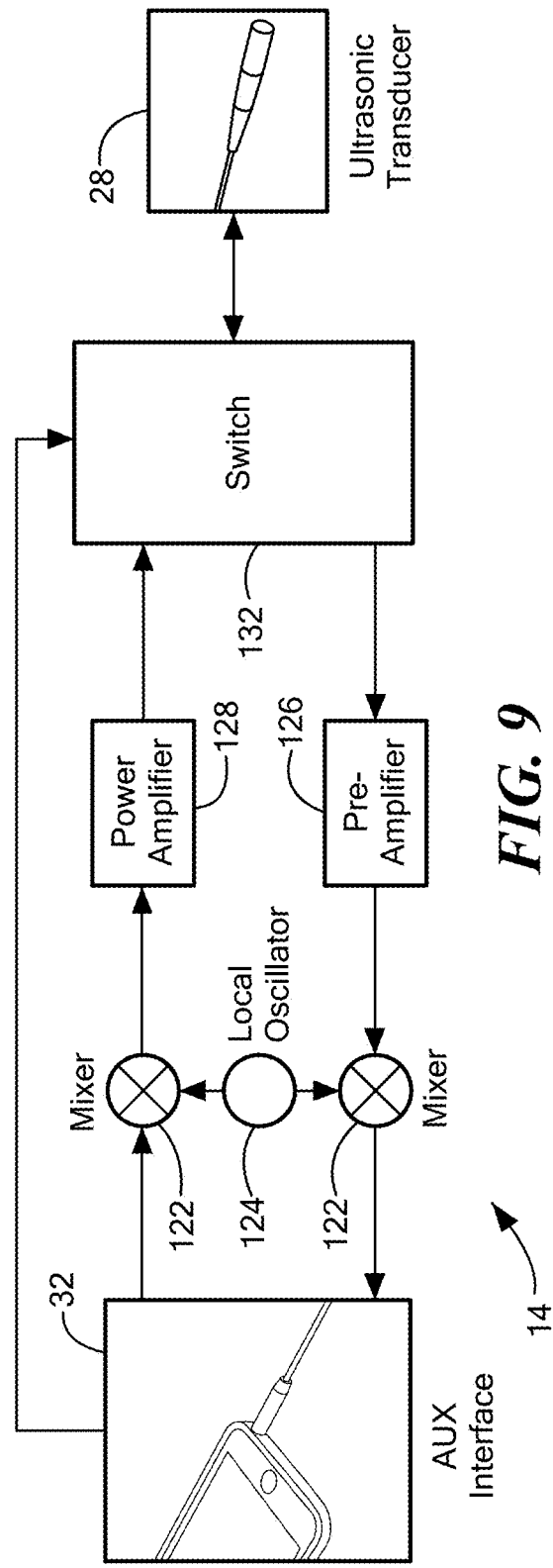
FIG. 9 is an example of hardware architecture in embodiments of the underwater acoustic communication system.

FIG. 9 illustrates an embodiment of a communication unit implementing a hardware architecture of the communication system. In some embodiments, the hardware can include, in addition to one or more ultrasonic transducers 28, an audio interface 32, mixers 122 and local oscillators 124, amplifiers 126, 128, and a switch 132 to control transmission and reception.

Audio or AUX Interface.

The audio interface can include an audio input channel and an audio output channel. In some embodiments, the audio interface can be the auxiliary (AUX) interface of an electronic device, such as a smartphone. In some embodiments of the communication unit, the AUX interface can be leveraged to transmit to and receive from the processing unit with the software implementation that is hosted on the electronic device. For example, a right AUX channel can be used to pilot the electronic switch, and a left AUX channel can be used to transmit data over the channel. In some embodiments, a microphone AUX channel can be used to receive data from the channel. In some embodiments, the communication unit can be provided as a unit that can removably connect to the audio interface of an electronic device, for example, via a plug or port. In some embodiments, the unit can be provided in a water-resistant or waterproof housing.

Amplifiers, Converters, Mixers/Oscillator, and Switch.

In some embodiments of the communication unit, external amplifiers can be used to enhance the communication range of the acoustic transducers. For example, at the transmitter chain, in some embodiments, a power amplifier 128 can be used. In some embodiments, a power amplifier can be selected that offers a small body size (for example, 11.00 mm×6.20 mm), which is suitable for miniaturization, and operational characteristics, i.e., maximum output power of 100 W, variable gain functionality, and 32 dB maximum gain at 100 kHz.

On the receiver side, in some embodiments, a low noise and low power variable gain amplifier can be used as a pre-amplifier 126. In some embodiments, a pre-amplifier can provide low noise figures of 4.5 nV/√Hz, an operational frequency from 10 kHz to 18 MHz, and voltage controlled gain up to 80 dB. The pre-amplifier can have a small body size, such as a 16-lead LFCSP package (for example, 3×3 mm), which is suitable for miniaturization. In some embodiments, the communication unit can incorporate two mixers, a local oscillator, and a bipolar timer for converting signals from Intermediate Frequency (IF) to Radio Frequency (RF) or to IF from RF. In some embodiments, the communication unit can employ a switch, such as an electronic switch, for enabling a single ultrasonic transducer to perform transmitter and receiver operations in a time-division duplex fashion.

Ultrasonic Transducers.

In the communication unit, one or more ultrasonic transducers 28 can be used. In some embodiments, two transducers can be used, one in the transmission chain and one in the reception chain. In some embodiments, an ultrasonic transducer can be a receiver hydrophone or can be a transducer used in a fish-finder device. In some embodiments, an ultrasonic transducer can have an operational frequency range between 1 Hz and 200 kHz. In some embodiments, an ultrasonic transducer can have a receiving sensitivity of −211 [dB re 1V/1 µPa at 1 m], flat over the operational frequency range, and transmitting sensitivity of 130 [dB re 1 pPa/V at 1 m] at 125 kHz. In some embodiments, an ultrasonic transducer can have a receiving sensitivity of −178 [dB re 1V/µPa at 1 m] and a transmitting sensitivity of 152 [dB re 1 µPa/V at 1 m]. In some embodiments, an ultrasonic transducer can be omnidirectional in at least a plane. In some embodiments, an ultrasonic transducer can have a directional beam pattern, to help minimize multipath effects in an echoic environment. For example, in some embodiments, an ultrasonic transducer can have a 270° vertical directivity pattern. In some embodiments, an ultrasonic transducer can have a beamwidth of 94°.

The processing unit and communication unit can be part of a computer system that executes programming for controlling the system for underwater acoustic communication as described herein. The computing system can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, cameras, displays, touchscreens, monitors, scanners, speakers, and printers. Interfaces can include universal serial bus (USB) ports, serial ports, parallel ports, game ports, and the like.

The computing device can access a network, including an underwater network, over a network connection that provides the computing device with telecommunications capabilities. Network connection enables the computing device to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a service (DaaS), backend as a service (BaaS), test environment as a service (TEaaS), API as a service (APIaaS), and integration platform as a service (IPaaS).

Other hardware components and devices can interface with the computing device.

The underwater acoustic communication system can be used in a number of applications. In some applications, the system can be used for one or more of texting and sending pictures and/or video while underwater. The system can be used for a variety of underwater wireless communications, and in a variety of underwater network devices.

Implementation of underwater communications for waterproof mobile devices can make such mobile devices truly amphibious and can allow research and development of a variety of useful apps, such as texting, receiving/sending pictures, and tweeting. Amphibious mobile device can be used for recreational or research purposes, such as to enable crowdsourced live monitoring of marine wildlife. Amphibious mobile device can include applications for the detection and notification of people in distress or at imminent risk of drowning.

In other aspects, a method of transmitting underwater acoustic signals to and from an underwater electronic device can be provided. A method can include providing an embodiment of an underwater acoustic communication system as described herein, and sending or receiving an underwater ultrasonic acoustic signal to or from an electronic device through a water communication channel.

In other aspects, a communication unit for an underwater acoustic communication system can be provided. Embodiments of a communication unit can include one or more ultrasonic transducers to transmit and receive underwater ultrasonic acoustic signals through a water communication channel; and a connection to an audio interface of an underwater electronic device to send and receive radio frequency (RF) audio signals to and from the audio interface. The communication unit can incorporate additional aspects and features of embodiments of the communication as described herein, such as, without limitation, a power amplifier in a transmission chain between the connection to the audio interface and the one or more ultrasonic transducers, and a pre-amplifier in a reception chain between the connection to the audio interface and the one or more ultrasonic transducers.

In other aspects, a system for enabling underwater acoustic communication in an underwater electronic device can be provided. A system for enabling communication in a device can be an embodiment of a processing unit in communication with an audio interface of the underwater electronic device as described herein. In some embodiments, the processing unit can include a protocol stack having a plurality of layers through with a packet is transmitted to enable ultrasonic communication to and from the underwater electronic device, the protocol stack including a physical layer, a medium access control layer, and an application layer. In some embodiments, the processing unit can be reconfigurable.

EXAMPLES

Two prototypes of the underwater acoustic communication system were implemented based on off-the-shelf Android smartphones using limited additional front-end hardware. The performance of the prototypes was extensively tested in a water tank testbed with multiple acoustic transducers. Experimental results showed that the prototype achieved a packet error rate (PER) of $1 \times 10^{-3}$, which is considerable given the strong multipath effect introduced by the water tank and the low sampling rate of the audio interface.

Figure 10:
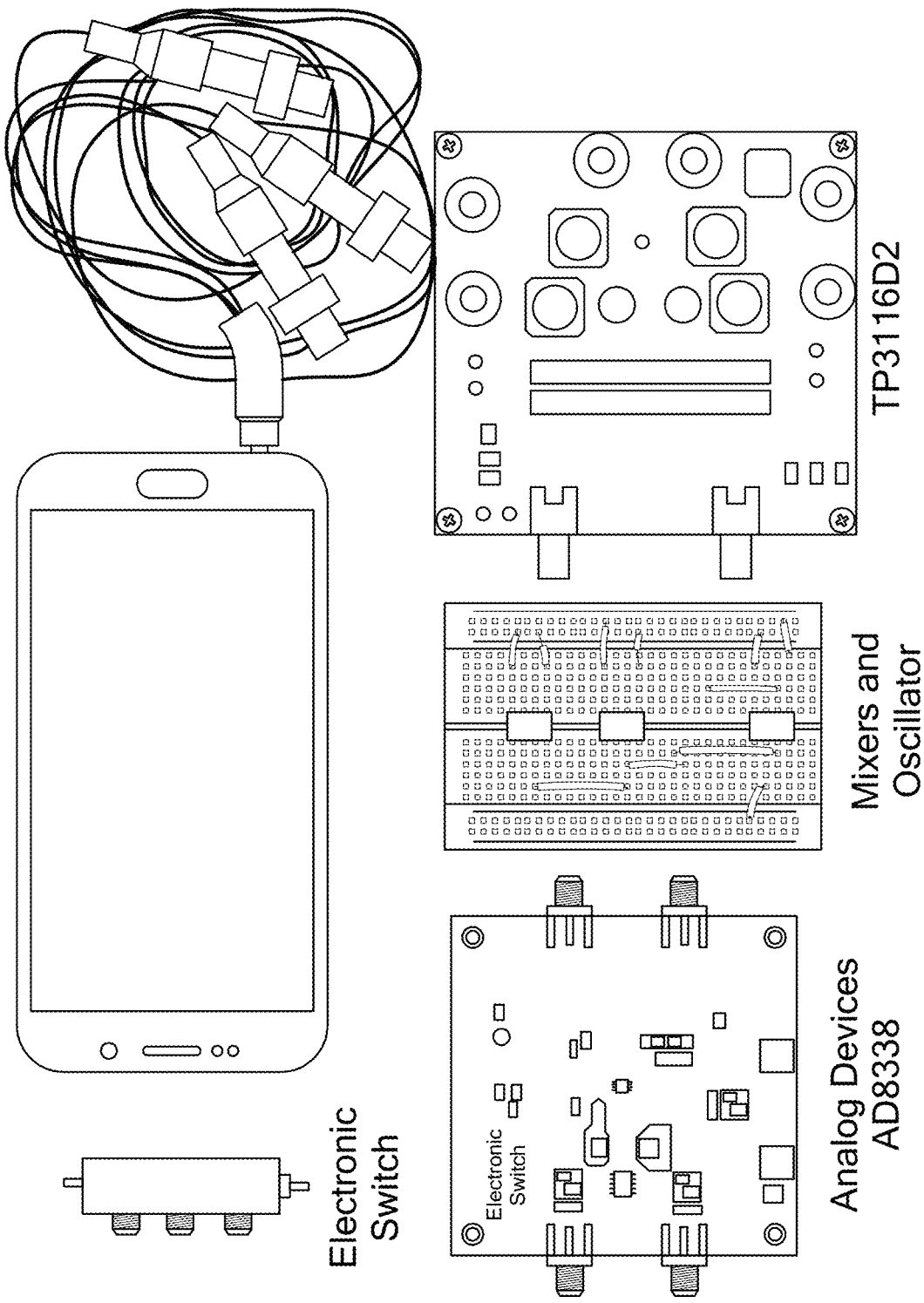
FIG. 10 is an example of hardware components of embodiments of the underwater acoustic communication system.

For the hardware side of the communication unit, in one prototype Texas Instruments TPA3116D2 class-D power amplifier was used. The TPA3116D2 is a power amplifier that offers a small body size (11.00 mm×6.20 mm), which is suitable for miniaturization, and operational characteristics, i.e., maximum output power of 100 W, variable gain functionality, and 32 dB maximum gain at 100 kHz. FIG. 10 illustrates a prototype incorporating TPA3116D2 with its Evaluation Module.

On the receiver side, an Analog Devices AD8338 low noise and low power variable gain amplifier was used as the pre-amplifier. The AD8338 provides low noise figures of 4.5 nV/√Hz, an operational frequency from 10 kHz to 18 MHz, and voltage controlled gain up to 80 dB. Furthermore, similar to TPA3116D2, AD8338 also offers a small body size 16-lead LFCSP package (3×3 mm), suitable for miniaturization. The prototype illustrated in FIG. 10 incorporated an evaluation board of the AD8338. This prototype also incorporated two mixers, AD633, and a local oscillator, STMicroelectronics NE555 bipolar timer, for converting signals from Intermediate Frequency (IF) to Radio Frequency (RF) or to IF from RF. Moreover, the prototype also used an electronic switch, Mini-Circuits ZX80-DR230+, for enabling a single ultrasonic transducer to perform transmitter and receiver operations in a time-division duplex fashion.

Two commercial off-the-shelf (COTS) ultrasonic transducers were used. In one prototype, a Teledyne RESON TC4013 ultrasonic transducer (receiver hydrophone) was used, which offers an operational frequency range between 1 Hz and 170 kHz. TC4013 provides receiving sensitivity of −211 [dB re 1V/1 μPa at 1 m], flat over the operational frequency range, and transmitting sensitivity of 130 [dB re 1 pPa/V at 1 m] at 125 kHz. TC4013 has an omnidirectional horizontal and 270° vertical directivity patterns. In the other prototype, the ultrasonic transducer was the AIRMAR P58. This transducer was originally designed to be used along with fish-finders, offers two operational frequencies 50 kHz and 200 kHz. The P58 was selected for its directional beam pattern, which aids to minimize multipath effect in an echoic environment (e.g., water test tank). Specifically, the P58 was operated at 50 kHz, where it offers a receiving sensitivity of −178 [dB re 1V/μPa at 1 m] and a transmitting sensitivity of 152 [dB re 1 μPa/V at 1 m]. Moreover, P58 provides a beamwidth of 94°.

The processing unit, or software part, of the prototype was implemented on the Android operating system (OS), with Java 8 as the programming language. This platform was selected because Android-based smartphones represent the most popular choice among smartphone users, with 86.8% share in 2016 Q3 according to data from the International Data Corporation (IDC) Worldwide Quarterly Mobile Phone Tracker. However, the software side of the communication system does not depend on any specific OS, and can be easily ported on other smartphone and mobile device OSs (e.g., iOS).

The devices used in the experiments were two off-the-box Samsung Galaxy S6 smartphones, running Android 5.1.1 (Lollipop) and 6.1 (Marshmallow). To prove that the software is platform-independent, the smartphones were not rooted or altered in any way on the Android framework kernel-side for the experiments. Furthermore, all the software written for this prototype belonged to a single Android app, and used only APIs offered by the standard Android framework (specifically, up to API level 23).

Figure 11:
FIG. 11 is an embodiment of an underwater acoustic communication system chat app.

To demonstrate the feasibility of mobile device underwater communication, a simple yet realistic app, named iSonarChat, was implemented. A screenshot is shown in FIG. 11. The app provided a simple-to-use interface to the users to send and receive text messages underwater. Whenever the SEND button was pressed by the user in the main activity, the message contained in the upper textbox was encoded into a Unicode (UTF-8) string, to support for example Emoji and non-English characters (e.g., accented characters). Such string was then sent to the communication system network stack (described above in the section entitled Software-Defined Network Stack of Communication System) to be sent over the acoustic underwater channel. At the receiver's side, the message was processed through the same network stack and sent to the Main-Activity for display. The communication system network stack was implemented as a stand-alone library written in Java, and was independent of the iSonarChat app implemented with this prototype.

Figure 12:
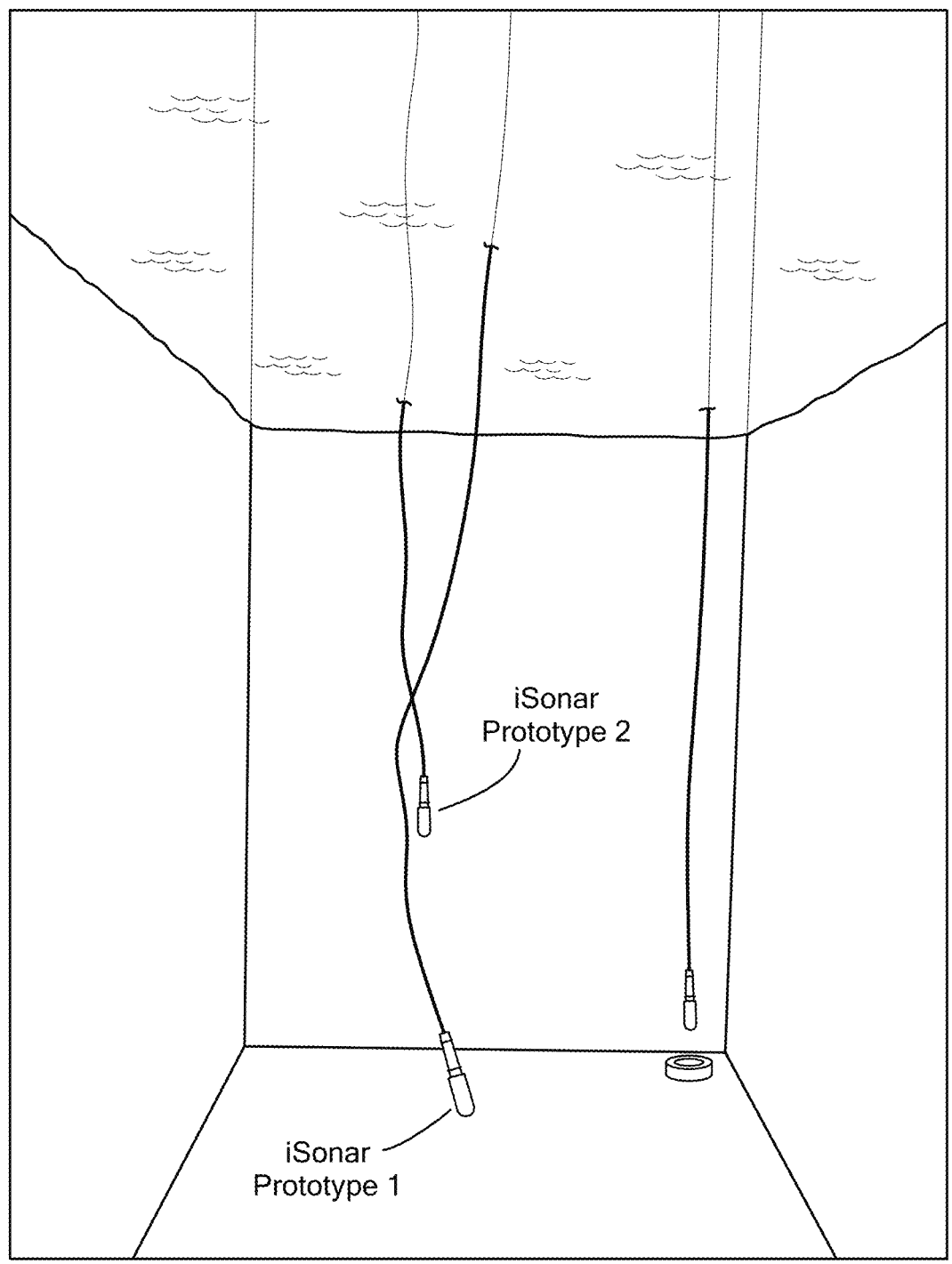
FIG. 12 is an illustration of a deployment of two prototypes of an underwater acoustic communication system in a water test tank.

A series of experiments were conducted in a water test tank of dimensions 2.5 m×2 m×1 m, where two communication system prototypes were deployed, termed iSonar Prototype 1 and iSonar Prototype 2, as shown in FIG. 12. In these experiments, the main goals were to (i) prove the functionality of the communication system prototype; and (ii) provide quantitative performance evaluation for the communication system prototype. Accordingly, the signaling scheme (ZP-OFDM) described above was leveraged over a bandwidth of B=11.025 kHz, as dictated by the 44.1 ksample/s audio sampling rate of the smartphones, and K=256 subcarriers. In the experiments, carrier frequencies of $f_c$=50 kHz and $f_c$=125 kHz were used for AIRMAR P58 and Teledyne RESON TC4013, respectively. The frequencies were selected where the communication system prototypes can offer the highest transmit and receive gain combined according to the specifics of the transducers used. Moreover, guard and pause intervals of 14.5 ms were defined to address the multipath spread in the water test tank, and subcarrier symbols were encoded either with Binary-Phase-Shift-Keying (BPSK) or Gray-encoded Quadrature-Phase-Shift-Keying (QPSK).

BER Vs. SNR.

The bit-error-rate (BER) performance versus signal-to-noise ratio (SNR) per OFDM symbols measured at the receiver was evaluated, in the absence of external interference, with two different ultrasonic transducers for modulation schemes (i.e., BPSK and QPSK). By adjusting the volume of the smartphone, the input power was varied at the transmitter of the communication system prototype to obtain various values of SNR at the receiver of the communication system prototype. From FIG. 13, it can be concluded that the BPSK modulation scheme outperforms the QPSK modulation scheme and the BER was a decreasing function of the SNR. Specifically, for the experiments with Teledyne RESON TC4013, BPSK had a BER performance of $5 \times 10^{-3}$ at 17 dB and supported a physical layer data rate of 5 kbit/s, while QPSK modulation scheme reached a BER performance of $5 \times 10^{-2}$ at 17 dB and supported a physical layer data rate of 10 kbit/s. On the other hand, for the experiments with AIRMAR P58, significant improvements in BER performance of both BPSK and QPSK modulation schemes were observed. Particularly, the communication system prototype achieved 5 kbit/s (BPSK) with $1 \times 10^{-5}$ BER at 14 dB and 10 kbit/s (QPSK) with $2.5 \times 10^{-2}$ at 22 dB.

Throughput and Packet Error Rate Vs. SNR.

Figure 14:
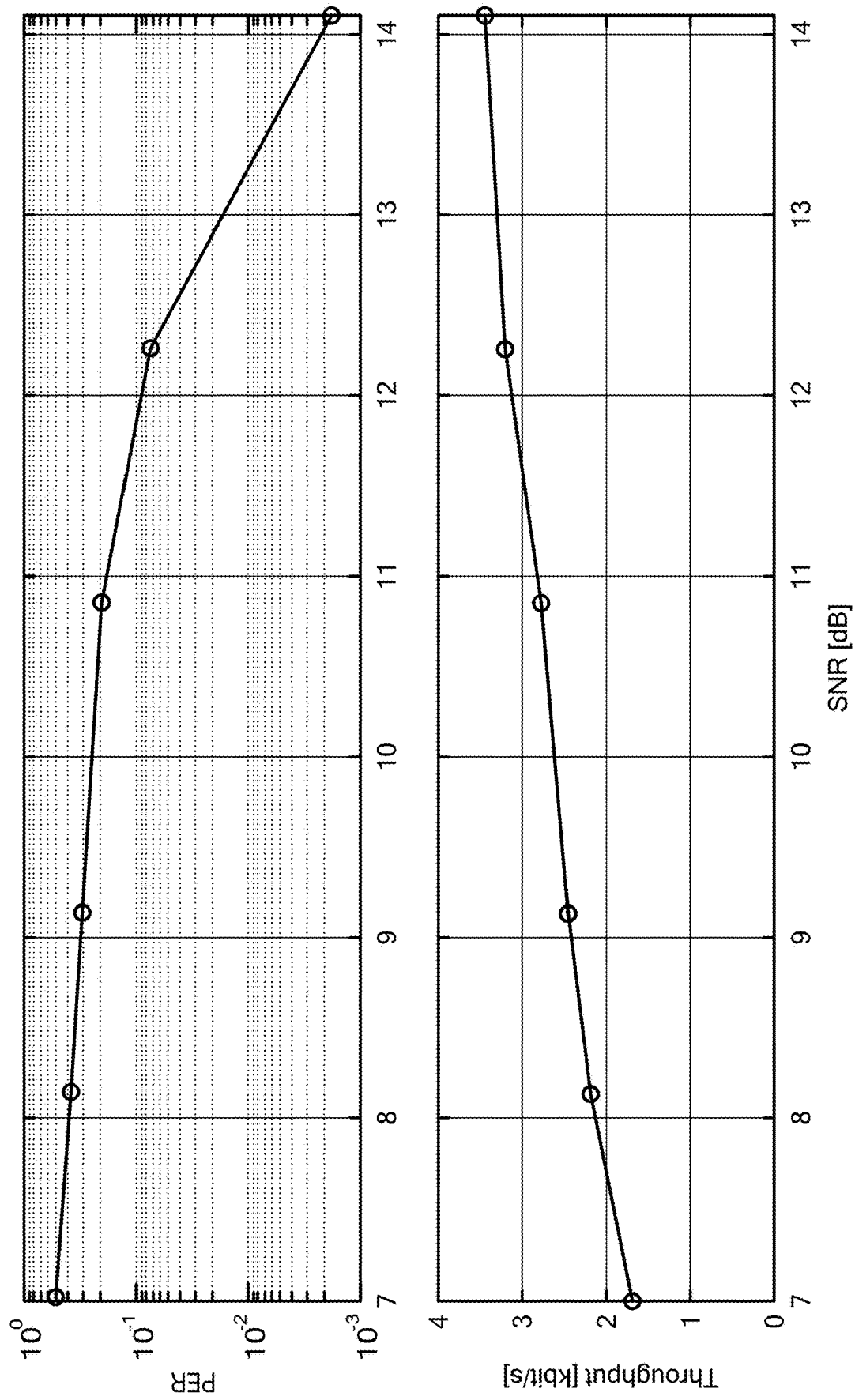
FIG. 14 is a graph of packet error rate (top) and throughput (bottom) as a function of SNR for a prototype of an underwater acoustic communication system prototype using BPSK.

In FIG. 14 (top), the Packet Error Rate (PER) for the BPSK modulation scheme with AIRMAR P58 transducers was evaluated over varying SNR values. The packet error rate is defined as the ratio between the number of packets dropped due to an error and the total number of packets generated from the application layer (iSonarChat app), where a physical layer packet size of 48 bytes was used. It can be observed that PER was a decreasing function of the SNR. Particularly, the communication system prototype was able to reach a PER performance of $1.7 \times 10^{-3}$ at 14 dB. FIG. 14 (bottom) shows the communication system prototype was capable of supporting an end-to-end throughput of 3.45 kbit/s at 14 dB.

Discussion.

By placing the ultrasonic transducers in a water tank, the multipath effect experienced by the signal was significantly increased; such increase is primarily due to the reflections from the water tank walls. The experiments were performed in such an environment to evaluate the performance of embodiments of the communication system in a "worst-case scenario" from an underwater channel standpoint.

Figure 13:
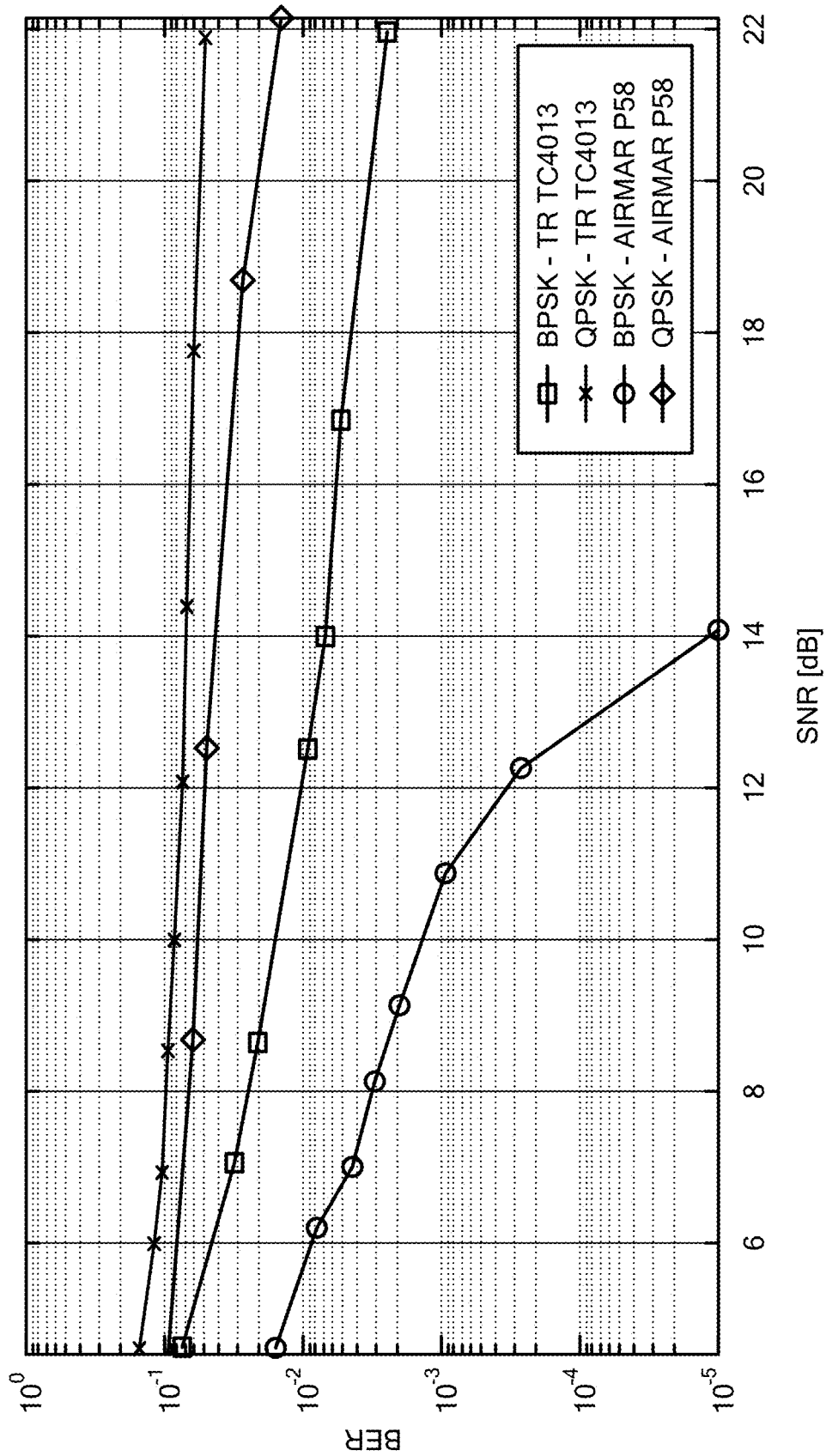
FIG. 13 is a graph of bit error rate (BER) performance versus signal-to-noise ratio (SNR) for prototypes of an underwater acoustic communication system.

It can be seen from FIG. 13 that using a transducer with a more directional beam pattern (e.g., AIRMAR P58) significantly decreased the effect of multipath and accordingly improved the BER performance as opposed to an omnidirectional transducer (e.g., Teledyne RESON TC4013). Furthermore, it is expected that the BER can be improved by about three orders of magnitude by conducting similar experiments in a lake or ocean environment, where the multipath effect would be further mitigated.

To summarize, by considering that (i) the experiments were performed in a water tank, with strong multipath effect; and (ii) the achievable throughput obtainable by communication system was limited by the low sampling rate of the audio interface (44,100 samples/sec), these results are satisfactory. As pointed out above, better results would be expected in a less hostile and more realistic water environment, such as open water, where more efficient bit encoding schemes (e.g., 8-PSK, 16-PSK) can be used to increase throughput significantly.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. An underwater acoustic communication system comprising an underwater electronic device including an audio interface, the device comprising:

a. a communication unit comprising one or more ultrasonic transducers in communication with a water communication channel to transform underwater ultrasonic acoustic signals received through the water communication channel to electrical signals and to transform electrical signals to ultrasonic acoustic signals for transmission on the water communication channel, the one or more ultrasonic transducers of the communication unit connected to the audio interface of the underwater electronic device to send and receive electrical signals to and from the audio interface; and b. a processing unit in communication with the audio interface, the processing unit operable to encode digital packets as audio signals for transmission to the audio interface and to reconstruct digital packets from audio signals received from the audio interface, the audio interface operable to convert the audio signals to and from electrical signals for transmission to and from the one or more ultrasonic transducers of the communication unit;

wherein the processing unit comprises a physical layer operative in a reception chain to convert an incoming audio signal from the communication unit via the audio interface to a physical layer frame, and including:

a module operative to read audio sound blocks, the audio sound blocks comprising data bytes representative of digital audio samples, and to create a plurality of identified physical layer blocks of the samples stored in memory; and a module operative to detect an incoming packet from the audio interface using a detection scheme, the detection scheme comprising searching for a marker sequence within a preamble of a physical layer frame by:

searching for a cross-correlation value V greater than a predetermined threshold $\theta_c$ within a correlation period T defined by a number of the samples, if V greater than the predetermined threshold $\theta_c$ is found, performing a cross-correlation for each sample in the correlation period, searching for a maximum correlation value V* within the correlation period for selection as a starting point of a new frame, and determining an identified block and a sample index within the identified block that corresponds to the maximum correlation value V*; and wherein the physical layer is further operative to:

determine a start block, a start index within the start block, an end block, and an end index within the end block for an identified physical layer frame; and provide a byte array comprising samples between the start index and the end index to a module requesting the physical layer frame.

2. The system of claim 1, wherein the processing unit includes a protocol stack comprising a plurality of layers through which the packets are transmitted to enable ultrasonic communication to and from the communication unit.

3. The system of claim 2, wherein the protocol stack includes a physical layer, a medium access control layer, and an application layer.

4. The system of claim 3, wherein the application layer is operative to encapsulate a payload into a byte stream, the payload selected from a text file, a data file, an audio file, a sound file, an image file, a graphic file, a photographic file, and a video file.

5. The system of claim 3, wherein the medium access control layer is operative to implement a data transmission protocol between the electronic device and a further electronic device.

6. The system of claim 1, wherein the processing unit comprises a physical layer operative in a transmission chain to construct one or more physical layer frames and to convert the one or more physical layer frames into an audio track for transmission via the audio interface to the communication unit.

7. The system of claim 6, wherein the physical layer is operative to encode an outgoing signal with an orthogonal frequency division multiplexing (OFDM) scheme in the physical layer frame.

8. The system of claim 6, wherein the processing unit is operative to encode sampled signals using an analog to digital converter to construct an audio track from the physical layer frame to be played by the audio interface.

9. The system of claim 1, wherein the processing unit is operative to construct a physical layer frame by encoding bits to symbols, interleaving data symbols with pilots and zero-padding, performing an Inverse Fast Fourier Transform operation to convert to a time domain representation, adding a preamble at a beginning of the physical layer frame and a guard interval between frames, upconverting to a carrier frequency, and encoding sampled signals to generate an audio track for transmission over the audio interface.

10. The system of claim 1, wherein the physical layer is operative to convert the audio signal into one or more physical layer blocks and store each block in memory with an identification to enable each physical layer block to be accessible upon request.

11. The system of claim 1, wherein the processing unit includes an application programming interface operative to communicate with a further application running on the electronic device, wherein the further application is a texting application, an audio application, a video application, a mapping application, a navigation application, a location tracking application, a geographic information system application, or a global positioning system application.

12. The system of claim 1, wherein the audio interface includes a microphone channel to receive data from the ultrasonic transducer, a channel to transmit data to the ultrasonic transducer, and a channel in communication with a switch.

13. The system of claim 1, wherein the ultrasonic transducer has a directional beam pattern or is omnidirectional in a plane.

14. The system of claim 1, wherein the communication unit includes a power amplifier in a transmission chain between the audio interface and the one or more ultrasonic transducers, and a pre-amplifier in a reception chain between the audio interface and the one or more ultrasonic transducers.

15. The system of claim 1, wherein the one or more ultrasonic transducers have an operational frequency range between 1 Hz and 200 kHz.

16. The system of claim 1, wherein the electronic device is a smartphone, a laptop computer, a tablet computer, a mobile device, a hand-held device, a wireless device, a wearable device, an amphibious device, a water-resistant device, or a waterproof device.

17. The system of claim 1, wherein the audio interface is an auxiliary interface of the electronic device.

18. An electronic device including an audio interface, comprising an underwater acoustic communication system comprising:

a. a communication unit comprising one or more ultrasonic transducers in communication with a water communication channel to transform underwater ultrasonic acoustic signals received through the water communication channel to electrical signals and to transform electrical signals to ultrasonic acoustic signals for transmission on the water communication channel, the one or more ultrasonic transducers of the communication unit connected to the audio interface of the electronic device to send and receive electrical signals to and from the audio interface; and b. a processing unit in communication with the audio interface, the processing unit operable to encode digital packets as audio signals for transmission to the audio interface and to reconstruct digital packets from audio signals received from the audio interface, the audio interface operable to convert the audio signals to and from electrical signals for transmission to and from the one or more ultrasonic transducers of the communication unit;

wherein the processing unit comprises a physical layer operative in a reception chain to convert an incoming audio signal from the communication unit via the audio interface to a physical layer frame, and including:

a module operative to read audio sound blocks, the audio sound blocks comprising data bytes representative of digital audio samples, and to create a plurality of identified physical layer blocks of the samples stored in memory; and a module operative to detect an incoming packet from the audio interface using a detection scheme, the detection scheme comprising searching for a marker sequence within a preamble of a physical layer frame by:

searching for a cross-correlation value V greater than a predetermined threshold $\theta_c$ within a correlation period T defined by a number of the samples, if V greater than the predetermined threshold $\theta_c$ is found, performing a cross-correlation for each sample in the correlation period, searching for a maximum correlation value V* within the correlation period for selection as a starting point of a new frame, and determining an identified block and a sample index within the identified block that corresponds to the maximum correlation value V*; and wherein the physical layer is further operative to:

determine a start block, a start index within the start block, an end block, and an end index within the end block for an identified physical layer frame; and provide a byte array comprising samples between the start index and the end index to a module requesting the physical layer frame.

19. A method of transmitting underwater acoustic signals to and from an underwater electronic device including an audio interface, comprising:

providing an underwater acoustic communication system comprising:

a. a communication unit comprising one or more ultrasonic transducers in communication with a water communication channel to transform underwater ultrasonic acoustic signals received through the water communication channel to electrical signals and to transform electrical signals to ultrasonic acoustic signals for transmission on the water communication channel, the one or more ultrasonic transducers of the communication unit connected to the audio interface of the underwater electronic device to send and receive electrical signals to and from the audio interface; and b. a processing unit in communication with the audio interface, the processing unit operable to encode digital packets as audio signals for transmission to the audio interface and to reconstruct digital packets from audio signals received from the audio interface, the audio interface operable to convert the audio signals to and from electrical signals for transmission to and from the one or more ultrasonic transducers of the communication unit;

wherein the processing unit comprises a physical layer operative in a reception chain to convert an incoming audio signal from the communication unit via the audio interface to a physical layer frame, and including:

a module operative to read audio sound blocks, the audio sound blocks comprising data bytes representative of digital audio samples, and to create a plurality of identified physical layer blocks of the samples stored in memory; and a module operative to detect an incoming packet from the audio interface using a detection scheme, the detection scheme comprising searching for a marker sequence within a preamble of a physical layer frame by:

searching for a cross-correlation value V greater than a predetermined threshold $\theta_c$ within a correlation period T defined by a number f samples, if V greater than the predetermined threshold $\theta_c$ is found, performing a cross-correlation for each sample in the correlation period searching for a maximum correlation value V* within the correlation period for selection as a starting point of a new frame, and determining an identified block and a sample index within the identified block that corresponds to the maximum correlation value V*;

determining, by the physical layer, a start block, a start index within the start block, an end block, and an end index within the end block for an identified physical layer frame; and providing, by the physical layer, a byte array comprising samples between the start index and the end index to a module requesting the physical layer frame; and sending or receiving an underwater ultrasonic acoustic signal to or from the electronic device through a water communication channel.

20. The system of claim 1, wherein the processing unit further comprises:

a block storer module operative to store each identified physical layer block in memory to enable each identified physical layer block to be accessible upon request;

a frame processor module, in communication with the block storer module, operative to receive requested blocks of the identified physical layer blocks in a requested frame interval and construct the received blocks into a physical layer payload byte array containing the digital audio samples; and a modulator module, in communication with the frame processor module, operative to convert the physical layer payload byte array to the physical layer frame for processing in the physical layer.

* * * * *